US012395881B2

(12) United States Patent
Bai et al.

(10) Patent No.: US 12,395,881 B2
(45) Date of Patent: Aug. 19, 2025

(54) INTERFERENCE PREDICTION WITH NETWORK CONFIGURATION INFORMATION

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/160,691

(22) Filed: Jan. 27, 2023

(65) Prior Publication Data
US 2024/0259848 A1 Aug. 1, 2024

(51) Int. Cl.
*H04W 24/10* (2009.01)
*H04B 17/336* (2015.01)
*H04W 24/02* (2009.01)

(52) U.S. Cl.
CPC .......... *H04W 24/10* (2013.01); *H04B 17/336* (2015.01); *H04W 24/02* (2013.01)

(58) Field of Classification Search
CPC .............................. H04W 24/10; H04B 17/336
See application file for complete search history.

(56) References Cited

U.S. PATENT DOCUMENTS

| 2019/0261370 A1* | 8/2019 | Amini | G06F 9/542 |
| 2021/0143883 A1* | 5/2021 | Yerramalli | H04B 7/0626 |

* cited by examiner

Primary Examiner — Zhiren Qin
(74) *Attorney, Agent, or Firm* — Holland & Hart

(57) ABSTRACT

Methods, systems, and devices for wireless communications are described. A device such as a user equipment (UE) may receive, via network signaling, an assistance information message that includes network configuration information corresponding to one or more inputs of an interference-prediction machine learning model. The network configuration information may include a set of parameters associated with one or more neighboring cell configurations. The UE may then generate, using the interference-prediction machine learning model, a channel interference prediction corresponding to one or more communication links at the UE based on the network configuration information included in the assistance information message. The UE may then communicate with a network entity based on the generated channel interference prediction.

20 Claims, 15 Drawing Sheets

//INTERFERENCE PREDICTION WITH
NETWORK CONFIGURATION
INFORMATION

FIELD OF TECHNOLOGY

The following relates to wireless communications, including interference prediction with network configuration information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support interference prediction with network configuration information. For example, the described techniques provide for enhanced use of machine learning for interference prediction at a user equipment (UE). A UE may receive, via signaling from a network (e.g., a network entity), an assistance information message that includes network configuration information that the UE may use as inputs to a configured machine learning model used for interference prediction. In some examples, the network configuration information may include a set of parameters associated with one or more neighboring cell configurations including one or more changes in a neighboring cell configuration, scheduling status of a neighboring cell, activity status, or any combination thereof. The UE may then generate, using the interference-prediction machine learning model, a channel interference prediction corresponding to one or more communication links at the UE based on the network configuration information included in the assistance information message and based on channel measurements performed by the UE. The UE may then communicate with a network entity based on the generated channel interference prediction.

A method for wireless communication at a UE is described. The method may include receiving an assistance information message including network configuration information corresponding to one or more inputs of an interference-prediction machine learning model, where the network configuration information includes a set of parameters associated with one or more neighboring cell configurations, generating, using the interference-prediction machine learning model, a channel interference prediction corresponding to one or more communication links at the UE based on the network configuration information included in the assistance information message, and communicating with a network entity based on the channel interference prediction.

An apparatus for wireless communication at a UE is described. The apparatus may include a processor, memory coupled with the processor, and instructions stored in the memory. The instructions may be executable by the processor to cause the apparatus to receive an assistance information message including network configuration information corresponding to one or more inputs of an interference-prediction machine learning model, where the network configuration information includes a set of parameters associated with one or more neighboring cell configurations, generate, using the interference-prediction machine learning model, a channel interference prediction corresponding to one or more communication links at the UE based on the network configuration information included in the assistance information message, and communicate with a network entity based on the channel interference prediction.

Another apparatus for wireless communication at a UE is described. The apparatus may include means for receiving an assistance information message including network configuration information corresponding to one or more inputs of an interference-prediction machine learning model, where the network configuration information includes a set of parameters associated with one or more neighboring cell configurations, means for generating, using the interference-prediction machine learning model, a channel interference prediction corresponding to one or more communication links at the UE based on the network configuration information included in the assistance information message, and means for communicating with a network entity based on the channel interference prediction.

A non-transitory computer-readable medium storing code for wireless communication at a UE is described. The code may include instructions executable by a processor to receive an assistance information message including network configuration information corresponding to one or more inputs of an interference-prediction machine learning model, where the network configuration information includes a set of parameters associated with one or more neighboring cell configurations, generate, using the interference-prediction machine learning model, a channel interference prediction corresponding to one or more communication links at the UE based on the network configuration information included in the assistance information message, and communicate with a network entity based on the channel interference prediction.

Some examples of the method, apparatuses, and non-transitory computer-readable medium described herein may further include operations, features, means, or instructions for identifying one or more input values indicated by the network configuration information, where the channel interference prediction may be generated based on the one or more input values and one or more channel state information (CSI) measurements.

Some examples of the method, apparatuses, and non-transitory computer-readable medium described herein may further include operations, features, means, or instructions for receiving, via the assistance information message, an indication of one or more modifications to the interference-prediction machine learning model based at least in part on the network configuration information, where the channel interference prediction may be generated in accordance with the one or more modifications to the interference-prediction machine learning model.

In some examples of the method, apparatuses, and non-transitory computer-readable medium described herein, the one or more modifications to the interference-prediction machine learning model include one or more parameters associated with the interference-prediction machine learning model that may have been modified, an algorithm configuration of the interference-prediction machine learning model that may have been modified, or both.

In some examples of the method, apparatuses, and non-transitory computer-readable medium described herein, the interference-prediction machine learning model includes a first interference-prediction machine learning model candidate of a set of multiple interference-prediction machine learning model candidates and the method, apparatuses, and non-transitory computer-readable medium may include further operations, features, means, or instructions for receiving an indication of the set of multiple interference-prediction machine learning model candidates including the first interference-prediction machine learning model candidate, each of the set of multiple interference-prediction machine learning model candidates corresponding to a respective network configuration and selecting the first interference-prediction machine learning model candidate based on the network configuration information.

Some examples of the method, apparatuses, and non-transitory computer-readable medium described herein may further include operations, features, means, or instructions for receiving an indication of one or more changes to the network configuration information and selecting a second interference-prediction machine learning model candidate from the set of multiple interference-prediction machine learning model candidates based on the one or more changes to the network configuration information.

Some examples of the method, apparatuses, and non-transitory computer-readable medium described herein may further include operations, features, means, or instructions for receiving an indication of one or more changes to the network configuration information and transmitting a message that requests an updated interference-prediction machine learning model based on the one or more changes to the network configuration information.

Some examples of the method, apparatuses, and non-transitory computer-readable medium described herein may further include operations, features, means, or instructions for receiving, via the assistance information message, an indication of a transmission timing pattern associated with active and inactive states of one or more devices of neighboring cells and applying the transmission timing pattern to the one or more inputs of the interference-prediction machine learning model to generate the channel interference prediction.

In some examples of the method, apparatuses, and non-transitory computer-readable medium described herein, the interference-prediction machine learning model includes a first interference-prediction machine learning model and the method, apparatuses, and non-transitory computer-readable medium may include further operations, features, means, or instructions for receiving, via the assistance information message, a transmission timing pattern associated with active and inactive states of one or more interfering devices and switching between the first interference-prediction machine learning model and a second interference-prediction machine learning model in accordance with the transmission timing pattern, where the channel interference prediction may be generated based on the active and inactive states of the one or more interfering devices.

In some examples of the method, apparatuses, and non-transitory computer-readable medium described herein, receiving the assistance information message may include operations, features, means, or instructions for receiving the assistance information message via a medium access control-control element (MAC-CE), a radio resource control (RRC) message, a downlink control information (DCI) message, or any combination thereof, where the assistance information message indicates values of the one or more inputs of the interference-prediction machine learning model.

In some examples of the method, apparatuses, and non-transitory computer-readable medium described herein, the network configuration information includes a load level associated with one or more neighboring cells, a load distribution associated with the one or more neighboring cells, an active status or inactive status of the one or more neighboring cells, duty cycle information, scheduling behavior information, or any combination thereof.

In some examples of the method, apparatuses, and non-transitory computer-readable medium described herein, generating the channel interference prediction may include operations, features, means, or instructions for generating a prediction of future channel interference associated with one or more beams, one or more beam groups, one or more transmission-reception points, or a combination thereof.

In some examples of the method, apparatuses, and non-transitory computer-readable medium described herein, generating the channel interference prediction may include operations, features, means, or instructions for performing one or more CSI measurements associated with the one or more communication links at the UE and generating the channel interference prediction based on the network configuration information and the one or more CSI measurements.

A method for wireless communication at a network entity is described. The method may include transmitting, to a UE, an assistance information message including network configuration information corresponding to one or more inputs of an interference-prediction machine learning model at the UE, where the network configuration information includes a set of parameters associated with one or more neighboring cell configurations, receiving, with a CSI report, a channel interference prediction corresponding to one or more communication links at the UE based on the network configuration information included in the assistance information message, and communicating with the UE based on the channel interference prediction.

An apparatus for wireless communication at a network entity is described. The apparatus may include a processor, memory coupled with the processor, and instructions stored in the memory. The instructions may be executable by the processor to cause the apparatus to transmit, to a UE, an assistance information message including network configuration information corresponding to one or more inputs of an interference-prediction machine learning model at the UE, where the network configuration information includes a set of parameters associated with one or more neighboring cell configurations, receive, with a CSI report, a channel interference prediction corresponding to one or more communication links at the UE based on the network configuration information included in the assistance information message, and communicate with the UE based on the channel interference prediction.

Another apparatus for wireless communication at a network entity is described. The apparatus may include means for transmitting, to a UE, an assistance information message including network configuration information corresponding to one or more inputs of an interference-prediction machine learning model at the UE, where the network configuration information includes a set of parameters associated with one or more neighboring cell configurations, means for receiving, with a CSI report, a channel interference prediction corresponding to one or more communication links at the UE based on the network configuration information included in the assistance information message, and means for communicating with the UE based on the channel interference prediction.

A non-transitory computer-readable medium storing code for wireless communication at a network entity is described. The code may include instructions executable by a processor to transmit, to a UE, an assistance information message including network configuration information corresponding to one or more inputs of an interference-prediction machine learning model at the UE, where the network configuration information includes a set of parameters associated with one or more neighboring cell configurations, receive, with a CSI report, a channel interference prediction corresponding to one or more communication links at the UE based on the network configuration information included in the assistance information message, and communicate with the UE based on the channel interference prediction.

Some examples of the method, apparatuses, and non-transitory computer-readable medium described herein may further include operations, features, means, or instructions for transmitting, via the assistance information message, an indication of one or more modifications to the interference-prediction machine learning model based at least in part on the network configuration information and receiving the channel interference prediction in accordance with the one or more modifications to the interference-prediction machine learning model.

In some examples of the method, apparatuses, and non-transitory computer-readable medium described herein, the one or more modifications to the interference-prediction machine learning model include one or more parameters associated with the interference-prediction machine learning model that may have been modified, an algorithm configuration of the interference-prediction machine learning model that may have been modified, or both.

In some examples of the method, apparatuses, and non-transitory computer-readable medium described herein, the interference-prediction machine learning model includes a first interference-prediction machine learning model candidate of a set of multiple interference-prediction machine learning model candidates and the method, apparatuses, and non-transitory computer-readable medium may include further operations, features, means, or instructions for transmitting an indication of the set of multiple interference-prediction machine learning model candidates including the first interference-prediction machine learning model candidate selected for the UE, each of the set of multiple interference-prediction machine learning model candidates corresponding to a respective network configuration.

In some examples of the method, apparatuses, and non-transitory computer-readable medium described herein, transmitting the assistance information message may include operations, features, means, or instructions for transmitting an indication of one or more changes to the network configuration information and receiving a message that requests an updated interference-prediction machine learning model based on the one or more changes to the network configuration information.

Some examples of the method, apparatuses, and non-transitory computer-readable medium described herein may further include operations, features, means, or instructions for transmitting, via the assistance information message, an indication of a transmission timing pattern associated with active and inactive states of one or more devices of neighboring cells to be applied to the one or more inputs of the interference-prediction machine learning model.

DETAILED DESCRIPTION

Figure 1:
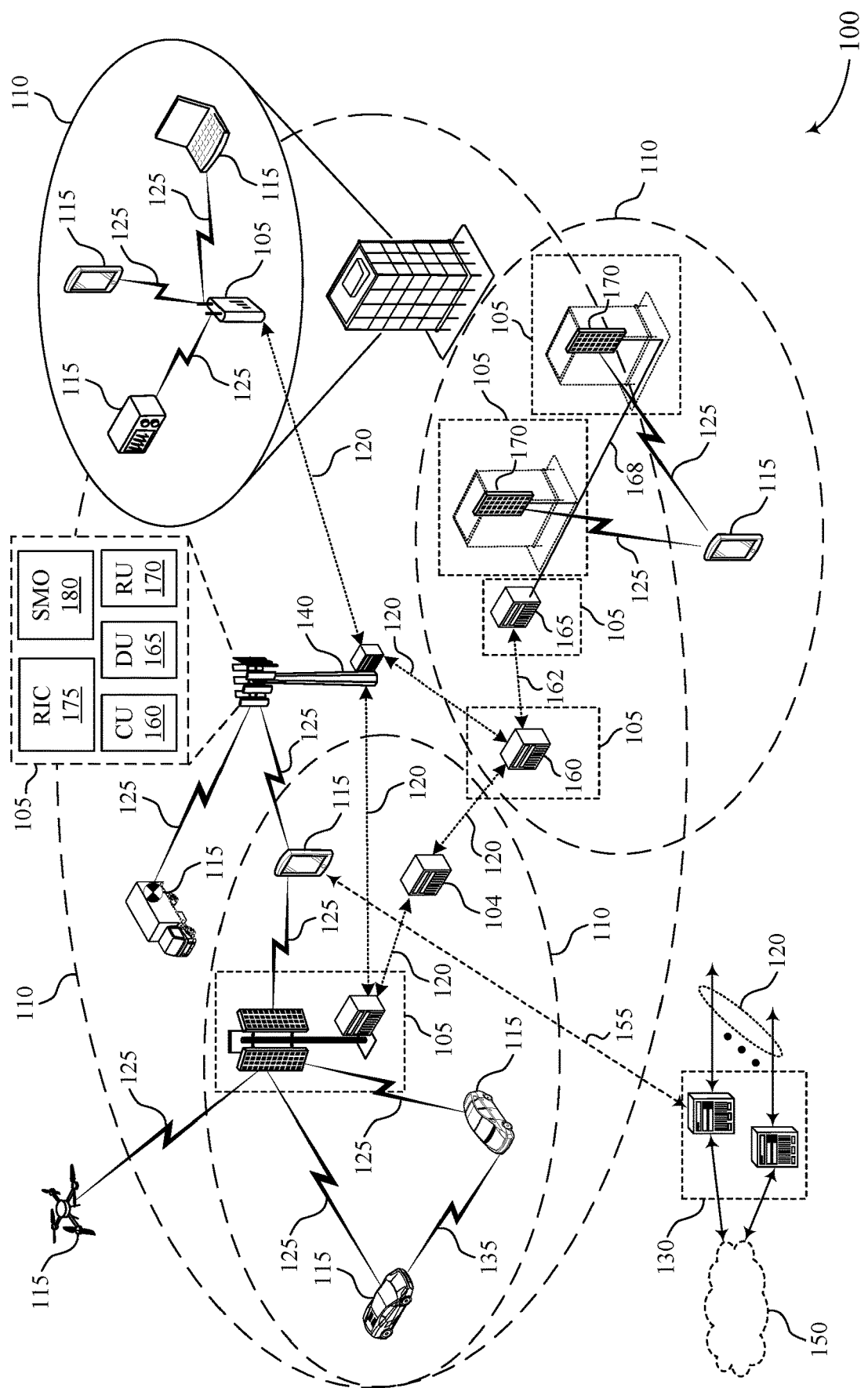
FIGS. 1, 2, and 3 illustrate examples of wireless communications systems that support interference prediction with network configuration information in accordance with one or more aspects of the present disclosure.

Wireless communications networks may employ artificial intelligence (AI) and machine learning at network devices or user devices, or both, to enhance performance and increase device integration. For example, some machine learning models may be configured for interference prediction, and may help a device such as a user equipment (UE) accurately predict interference based on previous channel measurements and network states. Such machine learning models may rely on inputs of channel state information (CSI) measurements performed at the UE, along with network configuration information, such as the configuration and load of nearby nodes, as well as UE or device locations within the network (e.g., the location of one or more wireless repeaters in a cell). Using this information, the machine learning model may predict the future interference level of beams used for communication.

In some implementations, however, a network configuration may be relatively dynamic in some communications systems (e.g., communications systems operating in relatively high radio frequency spectrum bands), and certain aspects of the network configuration (such as network node configuration and network load, to name a few) may change over time. Further, such communications systems may include a relatively large number nodes, such as repeaters, small cells, relays, and so on, which may have both active and inactive periods that vary according to a predictable scheduling pattern. While these changes in network configurations may increase coverage and energy savings in the network, they also may pose challenges for accurately using machine learning to predict interference.

To support accurate interference prediction using machine learning in dynamic systems, a UE may receive assistance information signaling from the network that notifies the UE of network configuration information. The UE may then use the network configuration information to perform interference prediction via a machine learning model. For example, the assistance information may include configuration information for other cells including on/off status information of the cells, duty cycle information, cell load information, or scheduling information. In some examples, the network may notify the UE (e.g., via configured signaling) of network configuration information that the UE may use as inputs to the machine learning model.

In some other examples, the network may instruct the UE to switch between different machine learning models or algorithms based on the network information. In such cases, the network may send updated parameters or algorithm information for the machine learning model, or the network may configure multiple different machine learning model candidates at the UE, and then may instruct the UE to switch between the different machine learning model candidates based on the network configuration.

Aspects of the disclosure are initially described in the context of wireless communications systems. Aspects of the disclosure are further illustrated by and described with reference to a process flow, apparatus diagrams, system diagrams, and flowcharts that relate to interference prediction with network configuration information.

FIG. 1 illustrates an example of a wireless communications system 100 that supports interference prediction with network configuration information in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support interference prediction with network configuration information as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Some wireless communications systems may support artificial intelligence (AI) and machine learning techniques to enhance over-the-air communications or other system information communications via the air interface between a UE and an active network entity. For example, AI and machine learning may be used to support CSI feedback enhancements (e.g., overhead reduction for performing CSI measurements, improved CSI measurement prediction accuracy, increased CSI measurement efficiency). Additionally, or alternatively, AI and machine learning may be used to support enhancements to beam management such as enhancements in beam prediction, spatial domain beamforming for overhead and latency reduction, increased beam selection accuracy including accuracy enhancements for different scenarios including those associated with heavy non-line of sight (NLOS) beamforming conditions.

In some examples, AI and machine learning techniques may be supported by or indicated by different capability indications (e.g., capability indication signaling), configuration procedures such as different training and inference processes, validation and testing procedures, and data management procedures associated with different AI and machine learning models. In some examples, existing radio access network interfaces and radio access network architecture (e.g., non-split and split architectures) may be enhanced with different data collection techniques and signaling support for AI and machine learning, which may increase network energy savings, load balancing, and device mobility optimizations. In addition, AI and machine learning may support network slicing and increased quality of experience (QoE) for wireless communications networks.

In some implementations of AI and machine learning, network entities and interface procedures may support data management and model management for different AI and machine learning models that may be implemented. For example, a network entity may support multi-vendor interoperability between different AI and machine learning functions such as data collection, model training, and model inference. Additionally, or alternatively, a network entity may support integration and collaboration of additional communications techniques such as orbital angular momentum (OAM), core network functions, new generation networks, and air interface implementations with AI and machine learning.

Some implementations of machine learning may include use of a neural network function (NNF), which may take the form of Y=F(X) as supported by a corresponding neural network model, which includes a relatively large quantity of interconnected processing units or nodes. A NNF may use a standardized input (X) and output (Y), along with information element support for inter-vendor interworking and flexible vendor implementations. A NNF may be classified or identified by a standardized or non-standardized NNF identifier (e.g., based on public and private extensions), and one single NNF may support multiple models based on implementations. For example, a neural network model may include a model structure and a parameter set (e.g., defined by an operator, vendor, or other third party). The model structure may correspond to a model identifier (e.g., model identifier that is unique to the network) which includes a default parameter set, and is associated with a corresponding NNF. The parameter set of the neural network model may include weights of the neural network model along with other model configuration parameters, such as location or configuration-specific parameters.

The wireless communications system 100 may implement AI, machine learning, or both, to enhance performance and increase device integration. For example, some machine learning models may be configured for interference prediction, and may help a device such as a UE 115 accurately predict interference based on previous channel measurements and network states. Such machine learning models may rely on inputs of CSI measurements along with network configuration information to predict the future interference level of beams used for communication.

In some implementations, however, network configuration is relatively dynamic, and certain aspects of the network configuration (such as network node configuration and network load) may change over time. While these changes in network configuration may increase coverage and energy savings in the network, they also may pose challenges for accurately using machine learning to predict interference.

To support accurate interference prediction using machine learning in dynamic systems, a UE 115 may receive assistance information signaling from the network that notifies the UE 115 of updated or new network configuration information. The UE 115 may then use the network configuration information to perform interference prediction via a machine learning model. For example, the assistance information may include configuration information for other cells including on/off status information of the cells, duty cycle information, cell load information, or scheduling information. In some examples, the network may notify the UE 115 of network configuration information that the UE 115 may use as inputs to the machine learning model.

Figure 2:
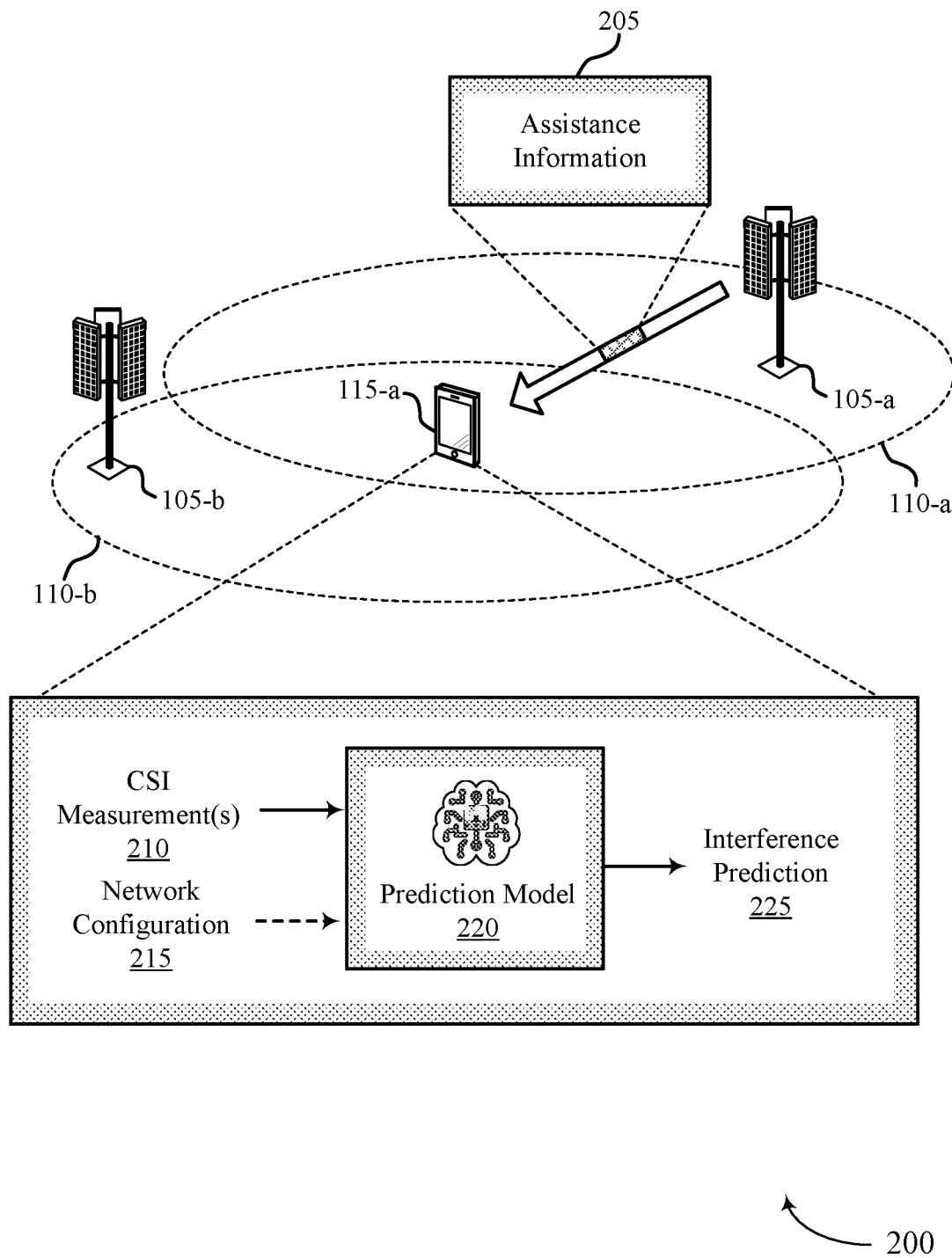

FIG. 2 illustrates an example of a wireless communications system 200 that supports interference prediction with network configuration information in accordance with one or more aspects of the present disclosure. For example, wireless communications system 200 may support communications between network entities (e.g., network entity 105-*a* providing coverage for cell 110-*a* and network entity 105-*b* providing coverage for cell 110-*b*) and a UE 115-*a*, each of which may be examples of corresponding devices described with reference to FIG. 1.

Some wireless communications systems may implement AI, machine learning, or both, to support accurate interference prediction at one or more wireless or network devices. For example, a device such as UE 115-*a* or a network entity (e.g., network entity 105-*a*, network entity 105-*b*, or both) may implement one or more machine learning models or prediction models to increase the accuracy of beam prediction and CSI measurements 210. In some examples, the network entity 105-*a* or the network entity 105-*b* may implement a machine learning model at times where the UE 115-*a* may be power-limited or computation-limited. The UE 115-*a* may transmit various measurements such as CSI measurements 210, sounding reference signaling (SRS), and other feedback information to the network entity 105-*a*, which the network entity 105-*a* may use as inputs to a machine learning model, which it may use to predict interference. The network entity 105-*a* may then transmit a scheduling decision to the UE 115-*a* based on the results of the machine learning prediction.

In some other cases, the machine learning model may be implemented at the UE 115-*a* (e.g., in cases that the UE 115-*a* has relatively high computation capabilities). For example, the UE 115-*a* may receive a machine learning model configuration from the network entity 105-*a* along with an indication of reference signals to measure (e.g., the machine learning model may be configured by the network entity 105-*a* or by some other central serving network node or third party service provider). The UE 115-a may run the machine learning model based on local measurement at the UE 115-a in addition to signaling and other information received from the network. After running the machine learning model, the UE 115-a may report the prediction results to the network entity 105-a based on various configuration and triggering conditions. In some examples, performing machine learning directly at the UE 115-a may increase prediction accuracy since the UE 115-a may have access to more UE-specific measurement results. Additionally, or alternatively, performing machine learning at the UE 115-a may reduce overhead relative to performing machine learning at the network entity 105-a, since the UE 115-a may not need to report extensive beam information, and the network entity 105-a may not need to report back prediction results.

In such examples that the UE 115-a performs machine learning techniques, the UE 115-a may predict interference levels associated with one or more working beams, and may correspondingly notify the network (e.g., via signaling to the network entity 105-a or the network entity 105-b) of the interference prediction 225. In some implementations, the UE 115-a may use different information as inputs to a machine learning model 220 (e.g., prediction model), in order to predict interference. For example, a machine learning model 220 may use interference statistics (e.g., statistical trends related to interference, instantaneous interference, and other interference data collected over time) to predict future interference trends or instantaneous interference. In one example, a machine learning model 220 may identify temporal correlations or other identifiable trends between packet transmission in neighboring cells over a time span of multiple slots. In such examples, the machine learning model 220 may use the CSI-IM measurements in prior time intervals (e.g., past slots) to infer the interference distribution in one or more future slots. In some other examples, the machine learning model may perform interference prediction on a per-beam, per-beam group, per-transmission reception point (TRP), or per-transmission configuration indicator (TCI) basis. For example, an interference prediction 225 may be made for each individual beam or TCI used by the UE 115-a over a time period.

In some implementations, the distribution of interference may be determined by the configuration and network load of the nearby nodes, the location of the UE 115-a in a serving cell, or any combination thereof. For example, a node configuration may include the activation (e.g., on/off) status of the node such as the on/off status of a configured duty cycle, scheduling resources and operating bandwidth of the node, a scheduling algorithm associated with the node (e.g., whether resources are preserved for periodic transmissions at the node). The machine learning model 220 may in some cases use network configuration information 215 including node configuration information and measured CSI-RS information from other cells to identify and predict interference for non-measured beams or for measured beams at a future time. Some machine learning models implemented by the UE 115-a may also be specific to the network configuration of other cells, including neighbor node status and load distribution status in other cells. In some examples, however, node configuration and network load may change over time, which may affect the accuracy of the interference prediction such that the machine learning model may be modified or replaced with a different machine learning model or parameter set to accommodate network changes. For example, some high frequency systems (e.g., millimeter wave (mmW) networks) may support a relatively greater number of nodes such as repeaters, small cells, inter-access backhaul (IAB) relays to increase coverage. These different nodes, however, may not all be active at the same time (e.g., to reduce power expenditure), and some nodes may be turned on based on demand or based on changing network configuration.

To support dynamic network configurations (e.g., network conditions and configurations that change over time), a UE 115-a may use various different types of machine learning models. For example, some machine learning model designs may use CSI-RS measurements as inputs, and may be updated with different parameter sets or algorithms based on different network configuration changes. In such examples, the UE 115-a may support a first prediction model (e.g., prediction module0) that corresponds to a first network configuration (e.g., network confg0), a second prediction model (e.g., prediction module1) that corresponds to a first network configuration (e.g., network confg1), and so on, and may switch between the different machine learning models based on different network configurations. Some other machine learning model designs may use both CSI-RS measurement information (e.g., CSI measurements 210) and network configuration information (e.g., network configuration information 215) as inputs. For example, the machine learning model 220 may input CSI measurements 210 along with network configuration information 215 such as load levels for neighboring cells (e.g., 0 for low load and 1 for high load), on/off status for each cell, and other static or semi-static network information. The UE 115-a may then obtain the interference prediction 225 from other cells based on the various inputs to the machine learning model 220.

To further support machine learning at the UE 115-a during changing network conditions, the network may provide assistance information to the UE 115-a to aid in the machine learning interference prediction at the UE 115-a. For example, the network entity 105-a may transmit an assistance information message 205 to the UE 115-a which includes cell information relating the network configuration of cells 110-a, 110-b, or both. In some examples, the assistance information message 205 may include information such as on/off status, duty cycle information, operating band information, cell load information, scheduling behavior type (e.g., preserved resource scheduling, dynamic scheduling).

In some examples, the assistance information message 205 may include one or more input values for the machine learning model 220 that correspond to the network configuration, and the UE 115-a may input these values into the machine learning model for interference prediction. For example, the network entity 105-a may transmit the assistance information message 205 via MAC-CE, RRC, DCI, or a combination thereof, each of which may include the input values corresponding to the network configuration.

In some other examples, the assistance information message 205 may include or indicate instructions for the UE 115-a to switch from one machine learning model to another machine learning model that corresponds to a correct or updated network configuration. For example, the network entity 105-a may transmit updated parameters, or one or more updated algorithm configurations of the machine learning prediction model based on network configuration changes. Additionally, or alternatively, the network entity 105-a may configure one or more additional machine learning model candidates for the UE 115-a, where each machine learning model candidate corresponds to a different network configuration. Then, when changes are made to the network configuration, the network entity 105-a may instruct the UE 115-*a* to switch between the different configured machine learning models. In some other examples, the network entity 105-*a* may notify the UE 115-*a* of network configuration changes, and the UE 115-*a* may request a model update from the network entity 105-*a* (or from other network servers) based on the assistance information message 205.

The information provided in the assistance information message 205 may provide the UE 115-*a* with additional information to support accurate interference prediction using machine learning techniques.

Figure 3:
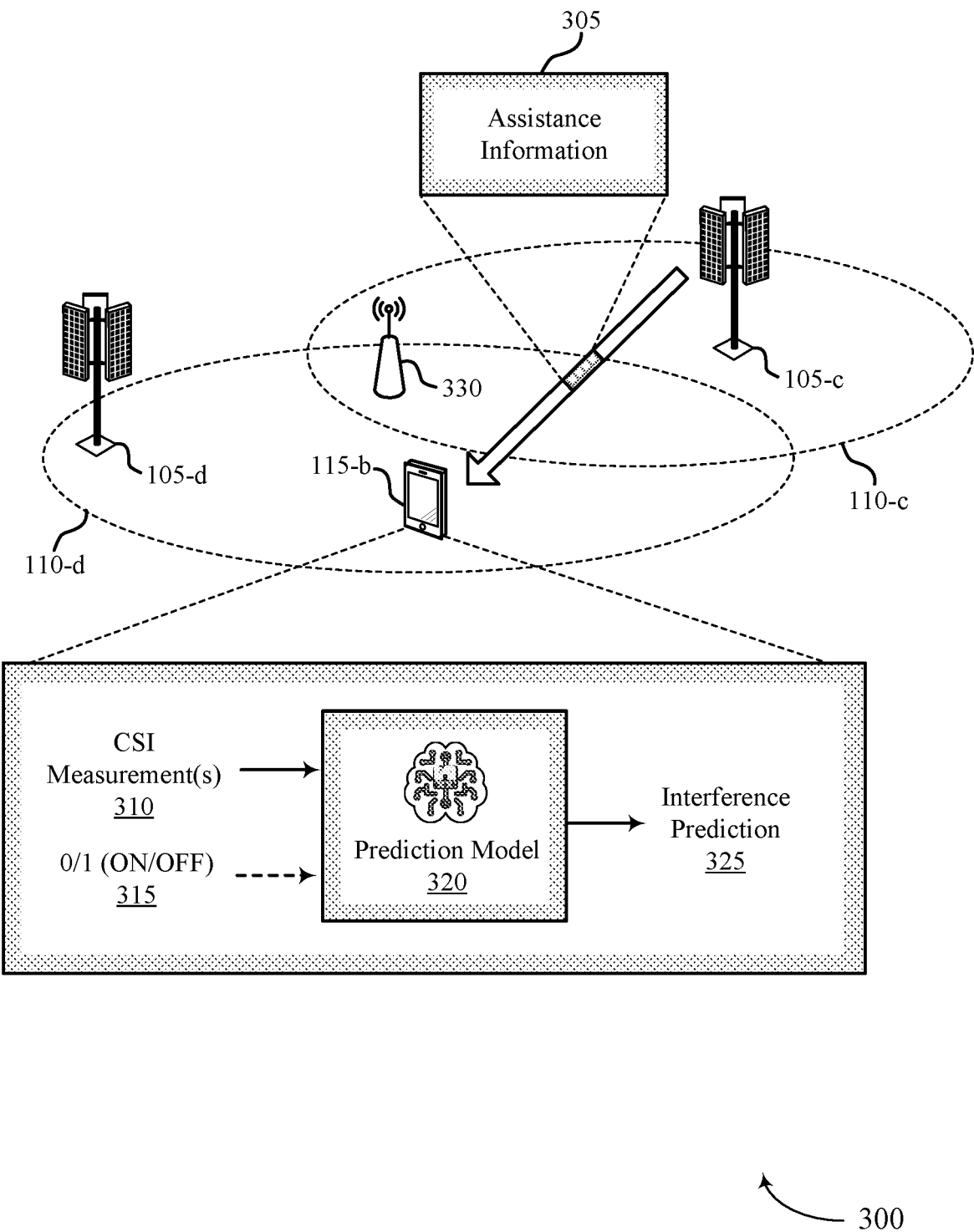

FIG. 3 illustrates an example of a wireless communications system 300 that supports interference prediction with network configuration information in accordance with one or more aspects of the present disclosure. For example, wireless communications system 300 may support communications between network entities (e.g., network entity 105-*c* providing coverage for cell 110-*c* and network entity 105-*d* providing coverage for cell 110-*d*) and a UE 115-*b*, each of which may be examples of corresponding devices described with reference to FIGS. 1 and 2.

To further support machine learning at the UE 115-*b* during changing network conditions, the network may provide assistance information to the UE 115-*b* to aid in the machine learning interference prediction at the UE 115-*b*. For example, the network entity 105-*c* may transmit an assistance information message 305 to the UE 115-*b* which includes cell information relating the network configuration of cells 110-*c*, 110-*d*, or both. In some examples, the assistance information message 305 may include information such as on/off status, duty cycle information, operating band information, cell load information, scheduling behavior type (e.g., preserved resource scheduling, dynamic scheduling).

In some examples, a network configuration may include a repeater 330 that operates to extend cell coverage and increase communications reliability for the cell 110-*c* and for the UE 115-*a*. The repeater 330 may operate according to an on/off cycle, where it may be periodically turned on (e.g., when the load for the UE 115-*a* is relatively high or above a threshold) or off (when the load for the UE 115-*a* is relatively low or below a threshold) in its coverage area. In such cases, the activity status (e.g., whether the repeater 330 is on or off) affects the interference prediction of the UE 115-*a* in the cell 110-*d*.

To support interference prediction for such a network and repeater configuration, the assistance information message 305 may include one or more input values for the machine learning model 320 that correspond to the network configuration, in addition to one or more CSI measurements 310. For example, one input port of the machine learning model 320 may be for the on or off status 315 of the repeater 330 (e.g., the input may be "1" if the repeater 330 is on, and "0" if the repeater 330 is off during a time duration). In some other examples, the UE 115-*b* may be configured with different machine learning models based on different repeater statuses, and the UE 115-*b* may switch between the different machine learning models based on the status of the repeater 330 and based on the assistance information message 305.

In either example, the network may inform the UE 115-*b* (via the assistance information message 305) of the time pattern of the on or off status 315 of the repeater 330, such that the UE 115-*b* may adjust the input of machine learning model 320 or select between different machine learning models based on the time status of the repeater 330 and the assistance information message 305. The UE 115-*b* may then generate the interference prediction 325 based on the information received in the assistance information message 305.

Figure 4:
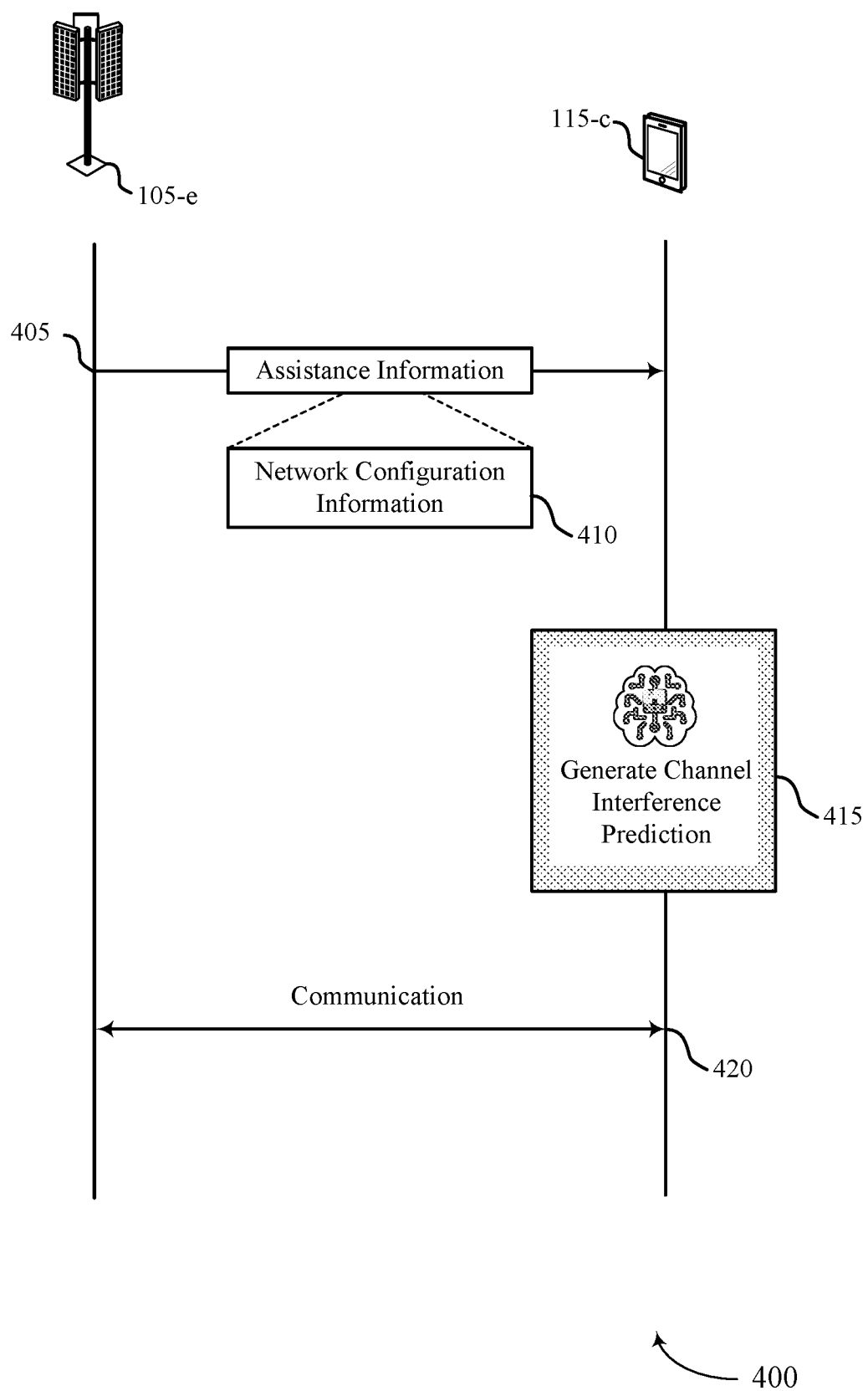
FIG. 4 illustrates an example of a process flow that supports interference prediction with network configuration information in accordance with one or more aspects of the present disclosure.

FIG. 4 illustrates an example of a process flow 400 that supports interference prediction with network configuration information in accordance with one or more aspects of the present disclosure. The process flow 400 may implement or may be implemented to realize or facilitate aspects of the wireless communications systems 100, 200, and 300. For example, the process flow 400 illustrates communication between a UE 115-*c* and a network entity 105-*e*. The UE 115-*c* and the network entity 105-*e* as illustrated by and described with reference to FIG. 4 may be examples of corresponding devices illustrated and described herein, including with reference to FIGS. 1, 2, and 3. In some examples, the UE 115-*c* and the network entity 105-*e* may support AI and machine learning applications.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time.

At 405, the network entity 105-*e* may transmit, to the UE 115-*c*, an assistance information message that includes network configuration information 410 corresponding to one or more inputs of an interference-prediction machine learning model. In some examples, the assistance information message may be sent via RRC, MAC-CE, DCI, or any combination thereof, and may indicate values of the one or more inputs of the interference-prediction machine learning model. The network configuration information 410 may also include a set of parameters associated with one or more neighboring cell configurations. In some examples, the network configuration information 410 may include or indicate one or more input values for the interference-prediction machine learning model including network configuration information and CSI measurement information. In some other examples, the network configuration information 410 the network configuration information may include a load level associated with one or more neighboring cells, a load distribution associated with the one or more neighboring cells, an active status or inactive status of the one or more neighboring cells, duty cycle information, scheduling behavior information, or any combination thereof.

At 415, the UE 115-*c* may generate, using the interference-prediction machine learning model, a channel interference prediction corresponding to one or more communication links at the UE 115-*c* based on the network configuration information included in the assistance information message. In some examples, the UE 115-*c* may receive, via the assistance information message, an indication of one or more modifications to the interference-prediction machine learning model based on the network configuration information 410. For example, the one or more modifications to the interference-prediction machine learning model may include one or more parameters associated with the interference-prediction machine learning model that have been modified, an algorithm configuration of the interference-prediction machine learning model that has been modified, or both. In such examples, the UE 115-*c* may generate the channel interference prediction in accordance with the one or more modifications to the interference-prediction machine learning model. In some examples, the UE 115-c may perform one or more CSI measurements associated with the one or more communication links at the UE 115-c, and may generate the channel interference prediction based on the network configuration information 410 and the one or more CSI measurements.

In some other examples, the interference prediction machine learning models may be a first interference prediction machine learning model candidate of a plurality of interference-prediction machine learning model candidates, where the UE 115-c receives an indication of the plurality of interference-prediction machine learning model candidates that each correspond to a respective network configuration. The UE 115-c may then select the first interference-prediction machine learning model candidate based on the network configuration information 410. In some examples, the UE 115-c may further receive an indication of one or more changes to the network configuration information 410, and may select a second interference prediction machine learning model candidate based on the one or more changes to the network configuration information 410.

In some other examples, the UE 115-c may receive, via the assistance information message, an indication of a transmission timing pattern associated with active and inactive states of one or more devices of neighboring cells, and the UE 115-c may apply the transmission timing pattern to the one or more inputs of the interference-prediction machine learning model to generate the channel interference prediction.

In some other examples, the UE 115-c may receive, via the assistance information message, a transmission timing pattern associated with active and inactive states of one or more interfering devices. The UE 115-c may then switch between the first interference-prediction machine learning model and a second interference-prediction machine learning model in accordance with the transmission timing pattern, where the channel interference prediction may be generated based on the active and inactive states of the one or more interfering devices.

At 420, the UE 115-c may communicate with the network entity 105-e based on the channel interference prediction. For example, the channel interference prediction may include a prediction of future channel interference associated with one or more beams, one or more beam groups, one or more transmission-reception points, or a combination thereof, which the network entity 105-e may use for scheduling communications and the UE 115-c may use to avoid potential interference.

Figure 5:
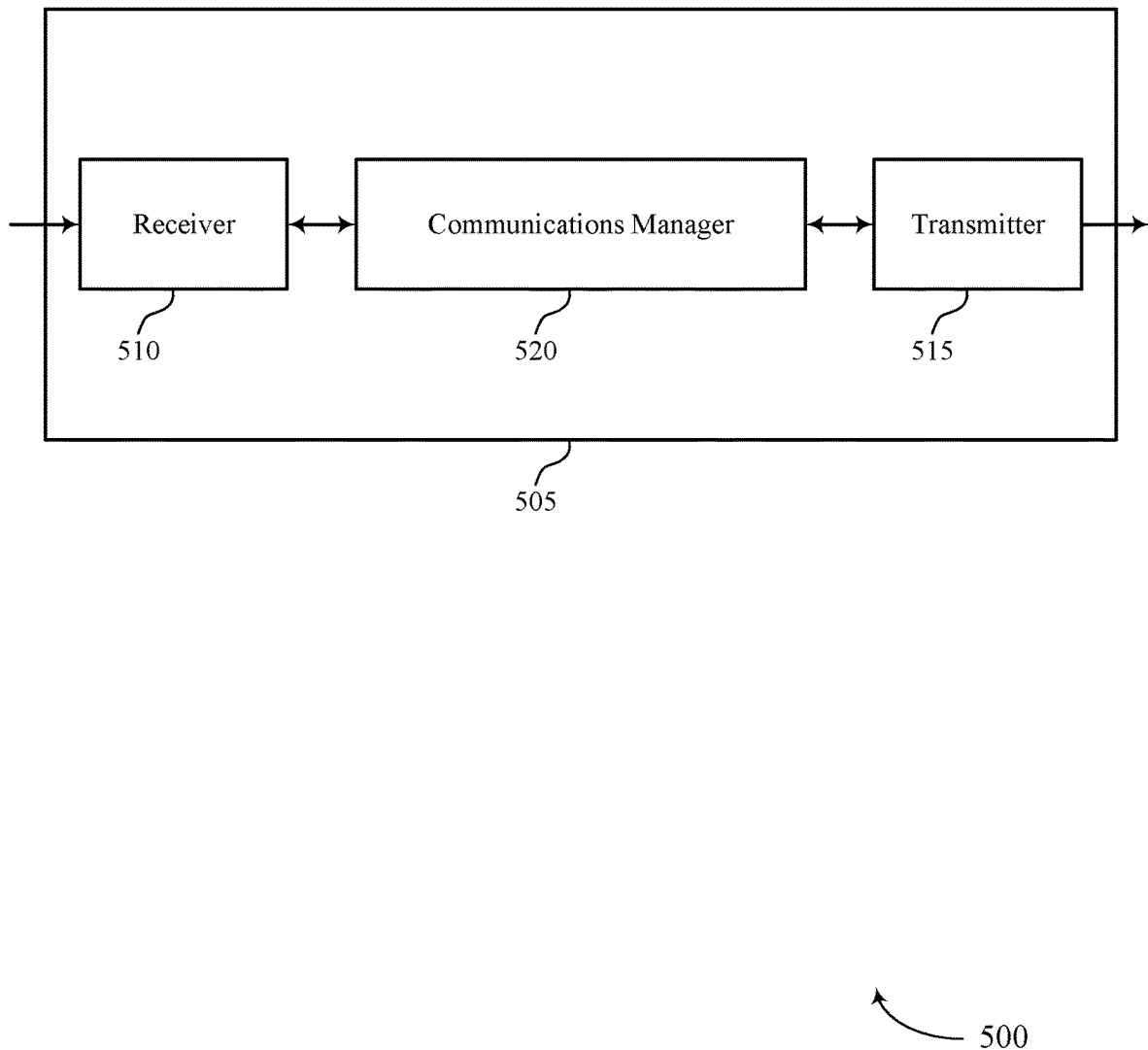
FIGS. 5 and 6 illustrate block diagrams of devices that support interference prediction with network configuration information in accordance with one or more aspects of the present disclosure.

FIG. 5 illustrates a block diagram 500 of a device 505 that supports interference prediction with network configuration information in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to interference prediction with network configuration information). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to interference prediction with network configuration information). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of interference prediction with network configuration information as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving an assistance information message including network configuration information corresponding to one or more inputs of an interference-prediction machine learning model, where the network configuration information includes a set of parameters associated with one or more neighboring cell configurations. The communications manager 520 may be configured as or otherwise support a means for generating, using the interference-prediction machine learning model, a channel interference prediction corresponding to one or more communication links at the UE based on the network configuration information included in the assistance information message. The communications manager 520 may be configured as or otherwise support a means for communicating with a network entity based on the channel interference prediction.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, more efficient utilization of communication resources, increased device integration and intelligence, enhanced machine learning implementations, and increased interference prediction accuracy.

Figure 6:
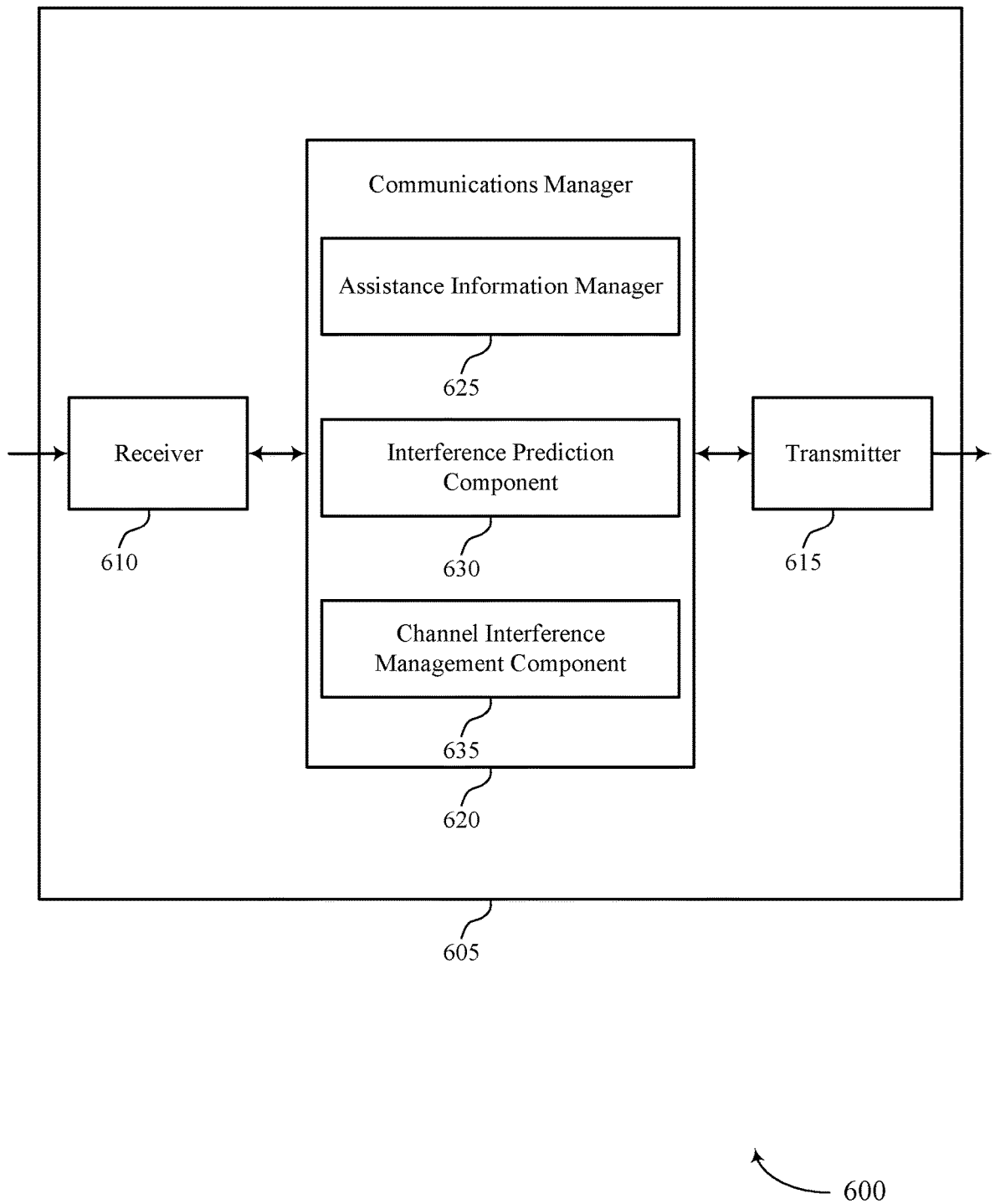

FIG. 6 illustrates a block diagram 600 of a device 605 that supports interference prediction with network configuration information in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to interference prediction with network configuration information). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to interference prediction with network configuration information). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of interference prediction with network configuration information as described herein. For example, the communications manager 620 may include an assistance information manager 625, an interference prediction component 630, a channel interference management component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The assistance information manager 625 may be configured as or otherwise support a means for receiving an assistance information message including network configuration information corresponding to one or more inputs of an interference-prediction machine learning model, where the network configuration information includes a set of parameters associated with one or more neighboring cell configurations. The interference prediction component 630 may be configured as or otherwise support a means for generating, using the interference-prediction machine learning model, a channel interference prediction corresponding to one or more communication links at the UE based on the network configuration information included in the assistance information message. The channel interference management component 635 may be configured as or otherwise support a means for communicating with a network entity based on the channel interference prediction.

Figure 7:
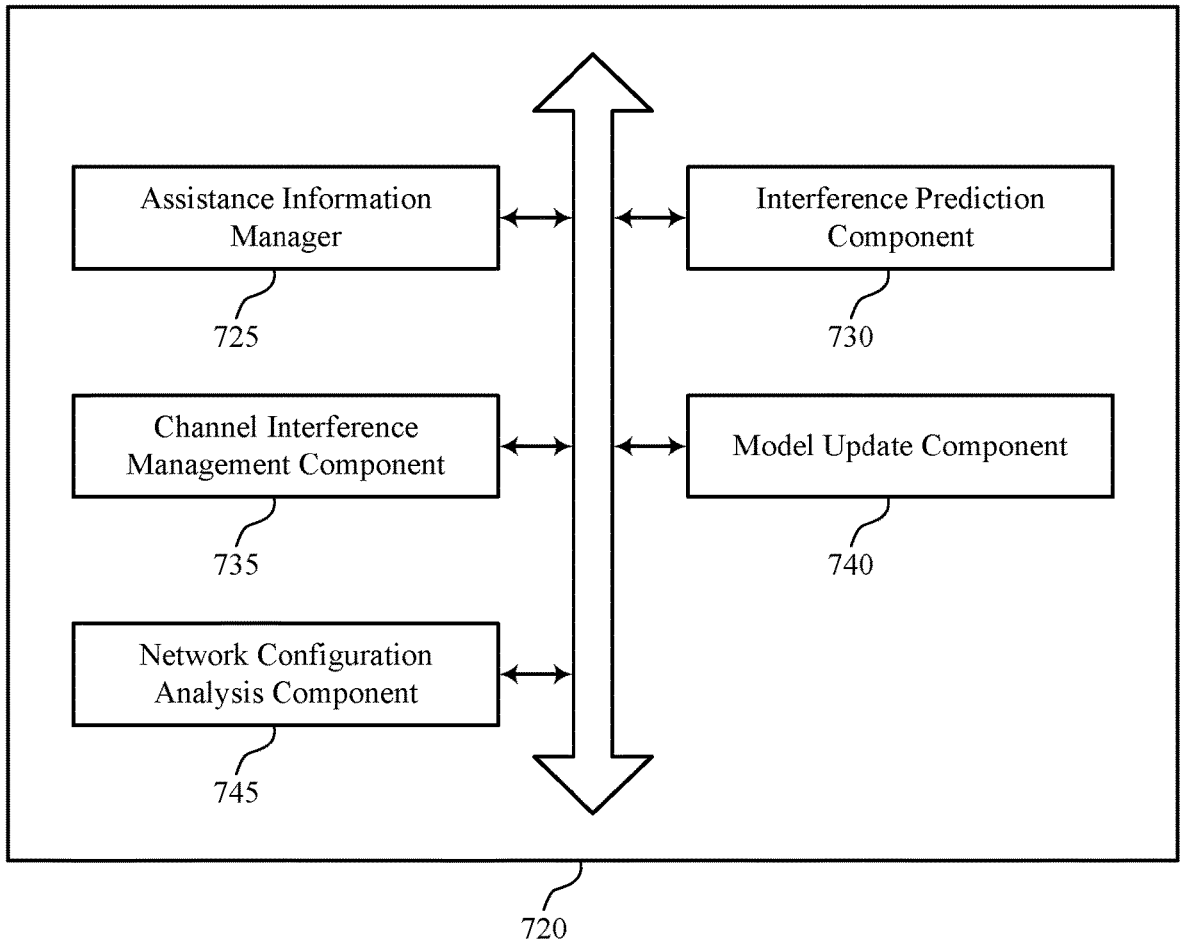
FIG. 7 illustrates a block diagram of a communications manager that supports interference prediction with network configuration information in accordance with one or more aspects of the present disclosure.

FIG. 7 illustrates a block diagram 700 of a communications manager 720 that supports interference prediction with network configuration information in accordance with one or more aspects of the present disclosure. The communications manager 720 may be an example of aspects of a communications manager 520, a communications manager 620, or both, as described herein. The communications manager 720, or various components thereof, may be an example of means for performing various aspects of interference prediction with network configuration information as described herein. For example, the communications manager 720 may include an assistance information manager 725, an interference prediction component 730, a channel interference management component 735, a model update component 740, a network configuration analysis component 745, or any combination thereof. Each of these components may communicate, directly or indirectly, with one another (e.g., via one or more buses).

The communications manager 720 may support wireless communication at a UE in accordance with examples as disclosed herein. The assistance information manager 725 may be configured as or otherwise support a means for receiving an assistance information message including network configuration information corresponding to one or more inputs of an interference-prediction machine learning model, where the network configuration information includes a set of parameters associated with one or more neighboring cell configurations. The interference prediction component 730 may be configured as or otherwise support a means for generating, using the interference-prediction machine learning model, a channel interference prediction corresponding to one or more communication links at the UE based on the network configuration information included in the assistance information message. The channel interference management component 735 may be configured as or otherwise support a means for communicating with a network entity based on the channel interference prediction.

In some examples, the interference prediction component 730 may be configured as or otherwise support a means for identifying one or more input values indicated by the network configuration information, where the channel interference prediction is generated based on the one or more input values and one or more channel state information measurements.

In some examples, the model update component 740 may be configured as or otherwise support a means for receiving, via the assistance information message, an indication of one or more modifications to the interference-prediction machine learning model based on the network configuration information, where the channel interference prediction is generated in accordance with the one or more modifications to the interference-prediction machine learning model.

In some examples, the one or more modifications to the interference-prediction machine learning model include one or more parameters associated with the interference-prediction machine learning model that have been modified, an algorithm configuration of the interference-prediction machine learning model that has been modified, or both.

In some examples, the interference-prediction machine learning model includes a first interference-prediction machine learning model candidate of a set of multiple interference-prediction machine learning model candidates, and the model update component 740 may be configured as or otherwise support a means for receiving an indication of the set of multiple interference-prediction machine learning model candidates including the first interference-prediction machine learning model candidate, each of the set of multiple interference-prediction machine learning model candidates corresponding to a respective network configuration. In some examples, the interference-prediction machine learning model includes a first interference-prediction machine learning model candidate of a set of multiple interference-prediction machine learning model candidates, and the model update component 740 may be configured as or otherwise support a means for selecting the first interference-prediction machine learning model candidate based on the network configuration information.

In some examples, the model update component 740 may be configured as or otherwise support a means for receiving an indication of one or more changes to the network configuration information. In some examples, the model update component 740 may be configured as or otherwise support a means for selecting a second interference-prediction machine learning model candidate from the set of multiple interference-prediction machine learning model candidates based on the one or more changes to the network configuration information.

In some examples, the model update component 740 may be configured as or otherwise support a means for receiving an indication of one or more changes to the network configuration information. In some examples, the channel interference management component 735 may be configured as or otherwise support a means for transmitting a message that requests an updated interference-prediction machine learning model based on the one or more changes to the network configuration information.

In some examples, the network configuration analysis component 745 may be configured as or otherwise support a means for receiving, via the assistance information message, an indication of a transmission timing pattern associated with active and inactive states of one or more devices of neighboring cells. In some examples, the interference prediction component 730 may be configured as or otherwise support a means for applying the transmission timing pattern to the one or more inputs of the interference-prediction machine learning model to generate the channel interference prediction.

In some examples, the interference-prediction machine learning model includes a first interference-prediction machine learning model, and the network configuration analysis component 745 may be configured as or otherwise support a means for receiving, via the assistance information message, a transmission timing pattern associated with active and inactive states of one or more interfering devices. In some examples, the interference-prediction machine learning model includes a first interference-prediction machine learning model, and the model update component 740 may be configured as or otherwise support a means for switching between the first interference-prediction machine learning model and a second interference-prediction machine learning model in accordance with the transmission timing pattern, where the channel interference prediction is generated based on the active and inactive states of the one or more interfering devices.

In some examples, to support receiving the assistance information message, the assistance information manager 725 may be configured as or otherwise support a means for receiving the assistance information message via a MAC-CE, an RRC message, a DCI message, or any combination thereof, where the assistance information message indicates values of the one or more inputs of the interference-prediction machine learning model.

In some examples, the network configuration information includes a load level associated with one or more neighboring cells, a load distribution associated with the one or more neighboring cells, an active status or inactive status of the one or more neighboring cells, duty cycle information, scheduling behavior information, or any combination thereof.

In some examples, to support generating the channel interference prediction, the interference prediction component 730 may be configured as or otherwise support a means for generating a prediction of future channel interference associated with one or more beams, one or more beam groups, one or more transmission-reception points, or a combination thereof.

In some examples, to support generating the channel interference prediction, the interference prediction component 730 may be configured as or otherwise support a means for performing one or more channel state information measurements associated with the one or more communication links at the UE. In some examples, to support generating the channel interference prediction, the interference prediction component 730 may be configured as or otherwise support a means for generating the channel interference prediction based on the network configuration information and the one or more channel state information measurements.

Figure 8:
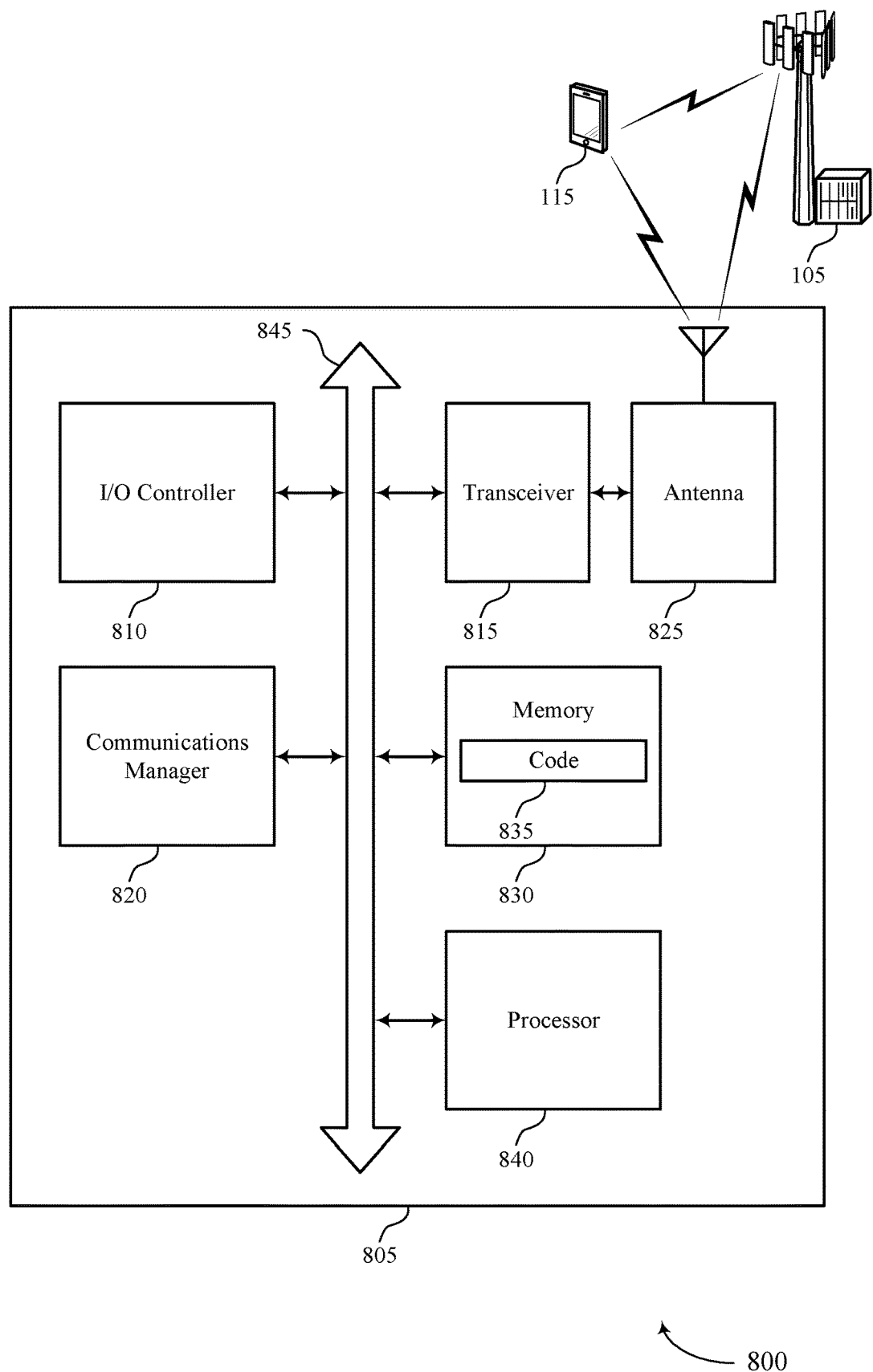
FIG. 8 illustrates a diagram of a system including a device that supports interference prediction with network configuration information in accordance with one or more aspects of the present disclosure.

FIG. 8 illustrates a diagram of a system 800 including a device 805 that supports interference prediction with network configuration information in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting interference prediction with network configuration information). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving an assistance information message including network configuration information corresponding to one or more inputs of an interference-prediction machine learning model, where the network configuration information includes a set of parameters associated with one or more neighboring cell configurations. The communications manager 820 may be configured as or otherwise support a means for generating, using the interference-prediction machine learning model, a channel interference prediction corresponding to one or more communication links at the UE based on the network configuration information included in the assistance information message. The communications manager 820 may be configured as or otherwise support a means for communicating with a network entity based on the channel interference prediction.

By including or configuring the communications manager 820 in accordance with examples as described herein, the device 805 may support techniques for improved communication reliability, reduced latency, improved user experience related to reduced interference latency, more efficient utilization of communication resources, improved coordination and integration between devices, reduced signaling overhead, increased efficiency and effectiveness for machine learning, and reduced communications interference.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of interference prediction with network configuration information as described herein, or the processor 840 and the memory 830 may be otherwise configured to perform or support such operations.

Figure 9:
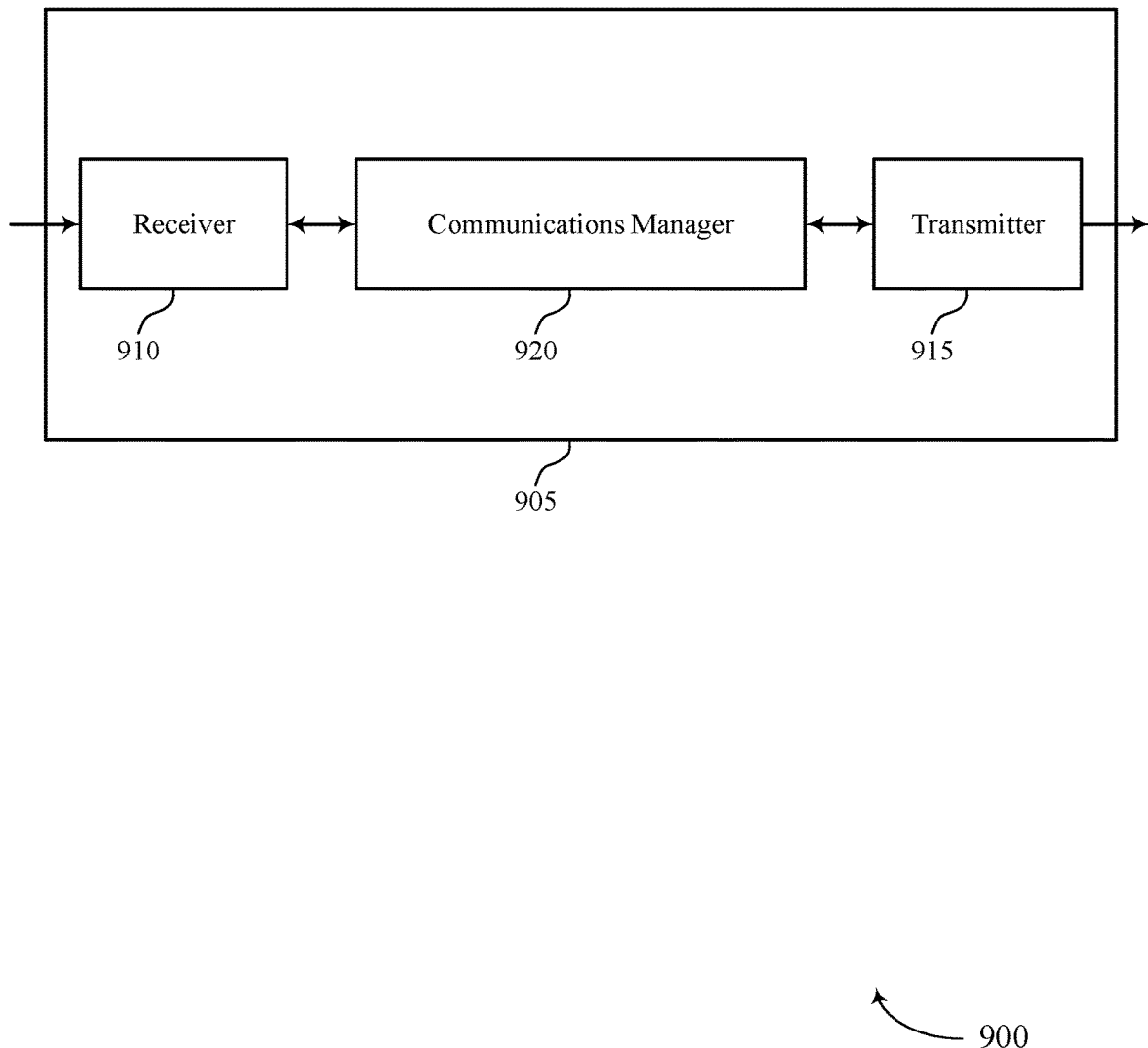
FIGS. 9 and 10 illustrate block diagrams of devices that support interference prediction with network configuration information in accordance with one or more aspects of the present disclosure.

FIG. 9 illustrates a block diagram 900 of a device 905 that supports interference prediction with network configuration information in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of interference prediction with network configuration information as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE, an assistance information message including network configuration information corresponding to one or more inputs of an interference-prediction machine learning model at the UE, where the network configuration information includes a set of parameters associated with one or more neighboring cell configurations. The communications manager 920 may be configured as or otherwise support a means for receiving, with a channel state information report, a channel interference prediction corresponding to one or more communication links at the UE based on the network configuration information included in the assistance information message. The communications manager 920 may be configured as or otherwise support a means for communicating with the UE based on the channel interference prediction.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, more efficient utilization of communication resources, increased device integration and intelligence, enhanced machine learning implementations, and increased interference prediction accuracy.

Figure 10:
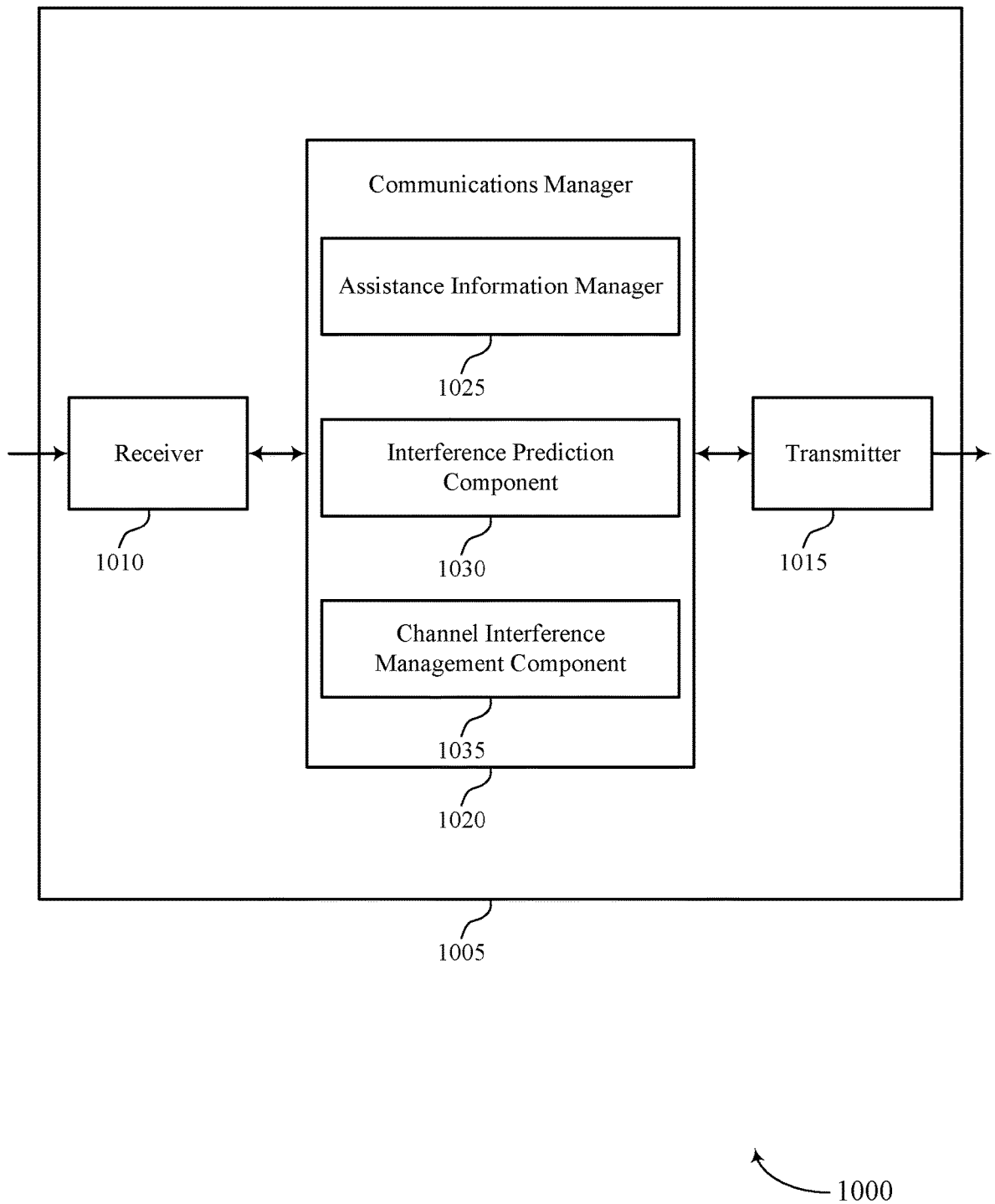

FIG. 10 illustrates a block diagram 1000 of a device 1005 that supports interference prediction with network configuration information in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of interference prediction with network configuration information as described herein. For example, the communications manager 1020 may include an assistance information manager 1025, an interference prediction component 1030, a channel interference management component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The assistance information manager 1025 may be configured as or otherwise support a means for transmitting, to a UE, an assistance information message including network configuration information corresponding to one or more inputs of an interference-prediction machine learning model at the UE, where the network configuration information includes a set of parameters associated with one or more neighboring cell configurations. The interference prediction component 1030 may be configured as or otherwise support a means for receiving, with a channel state information report, a channel interference prediction corresponding to one or more communication links at the UE based on the network configuration information included in the assistance information message. The channel interference management component 1035 may be configured as or otherwise support a means for communicating with the UE based on the channel interference prediction.

Figure 11:
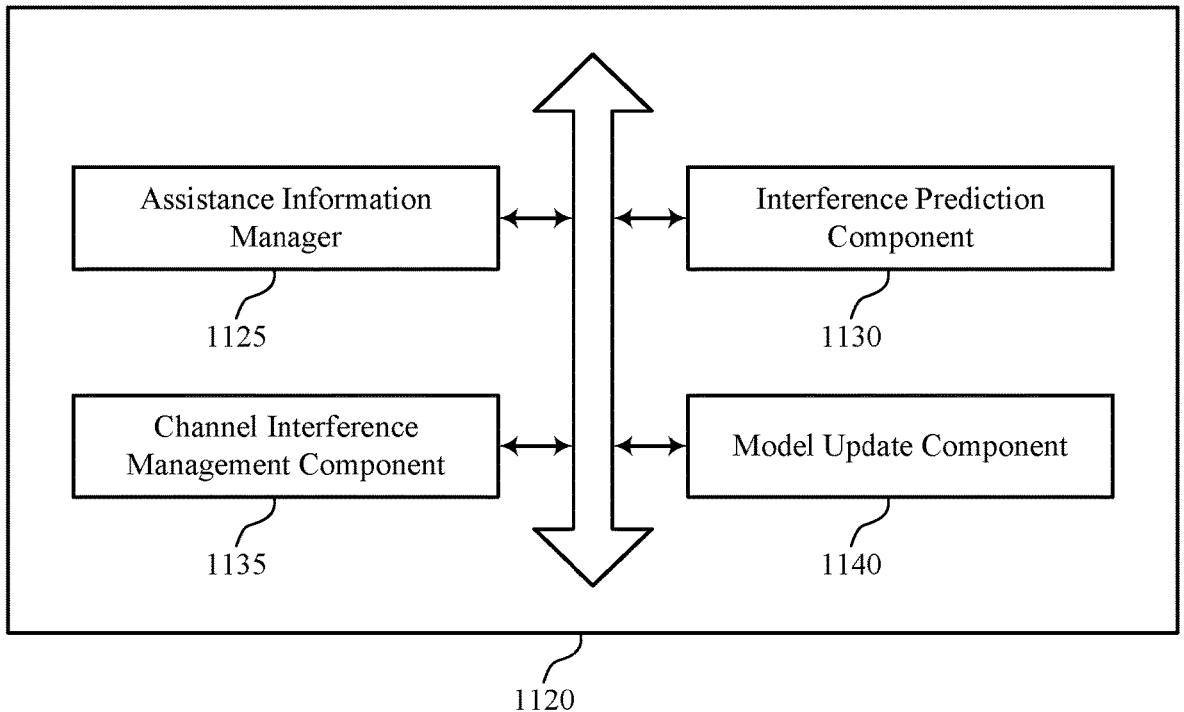
FIG. 11 illustrates a block diagram of a communications manager that supports interference prediction with network configuration information in accordance with one or more aspects of the present disclosure.

FIG. 11 illustrates a block diagram 1100 of a communications manager 1120 that supports interference prediction with network configuration information in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of interference prediction with network configuration information as described herein. For example, the communications manager 1120 may include an assistance information manager 1125, an interference prediction component 1130, a channel interference management component 1135, a model update component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The assistance information manager 1125 may be configured as or otherwise support a means for transmitting, to a UE, an assistance information message including network configuration information corresponding to one or more inputs of an interference-prediction machine learning model at the UE, where the network configuration information includes a set of parameters associated with one or more neighboring cell configurations. The interference prediction component 1130 may be configured as or otherwise support a means for receiving, with a channel state information report, a channel interference prediction corresponding to one or more communication links at the UE based on the network configuration information included in the assistance information message. The channel interference management component 1135 may be configured as or otherwise support a means for communicating with the UE based on the channel interference prediction.

In some examples, the model update component 1140 may be configured as or otherwise support a means for transmitting, via the assistance information message, an indication of one or more modifications to the interference-prediction machine learning model based on the network configuration information. In some examples, the interference prediction component 1130 may be configured as or otherwise support a means for receiving the channel interference prediction in accordance with the one or more modifications to the interference-prediction machine learning model.

In some examples, the one or more modifications to the interference-prediction machine learning model include one or more parameters associated with the interference-prediction machine learning model that have been modified, an algorithm configuration of the interference-prediction machine learning model that has been modified, or both.

In some examples, the interference-prediction machine learning model includes a first interference-prediction machine learning model candidate of a set of multiple interference-prediction machine learning model candidates, and the model update component 1140 may be configured as or otherwise support a means for transmitting an indication of the set of multiple interference-prediction machine learning model candidates including the first interference-prediction machine learning model candidate selected for the UE, each of the set of multiple interference-prediction machine learning model candidates corresponding to a respective network configuration.

In some examples, to support transmitting the assistance information message, the model update component 1140 may be configured as or otherwise support a means for transmitting an indication of one or more changes to the network configuration information. In some examples, to support transmitting the assistance information message, the model update component 1140 may be configured as or otherwise support a means for receiving a message that requests an updated interference-prediction machine learning model based on the one or more changes to the network configuration information.

In some examples, the channel interference management component 1135 may be configured as or otherwise support a means for transmitting, via the assistance information message, an indication of a transmission timing pattern associated with active and inactive states of one or more devices of neighboring cells to be applied to the one or more inputs of the interference-prediction machine learning model.

Figure 12:
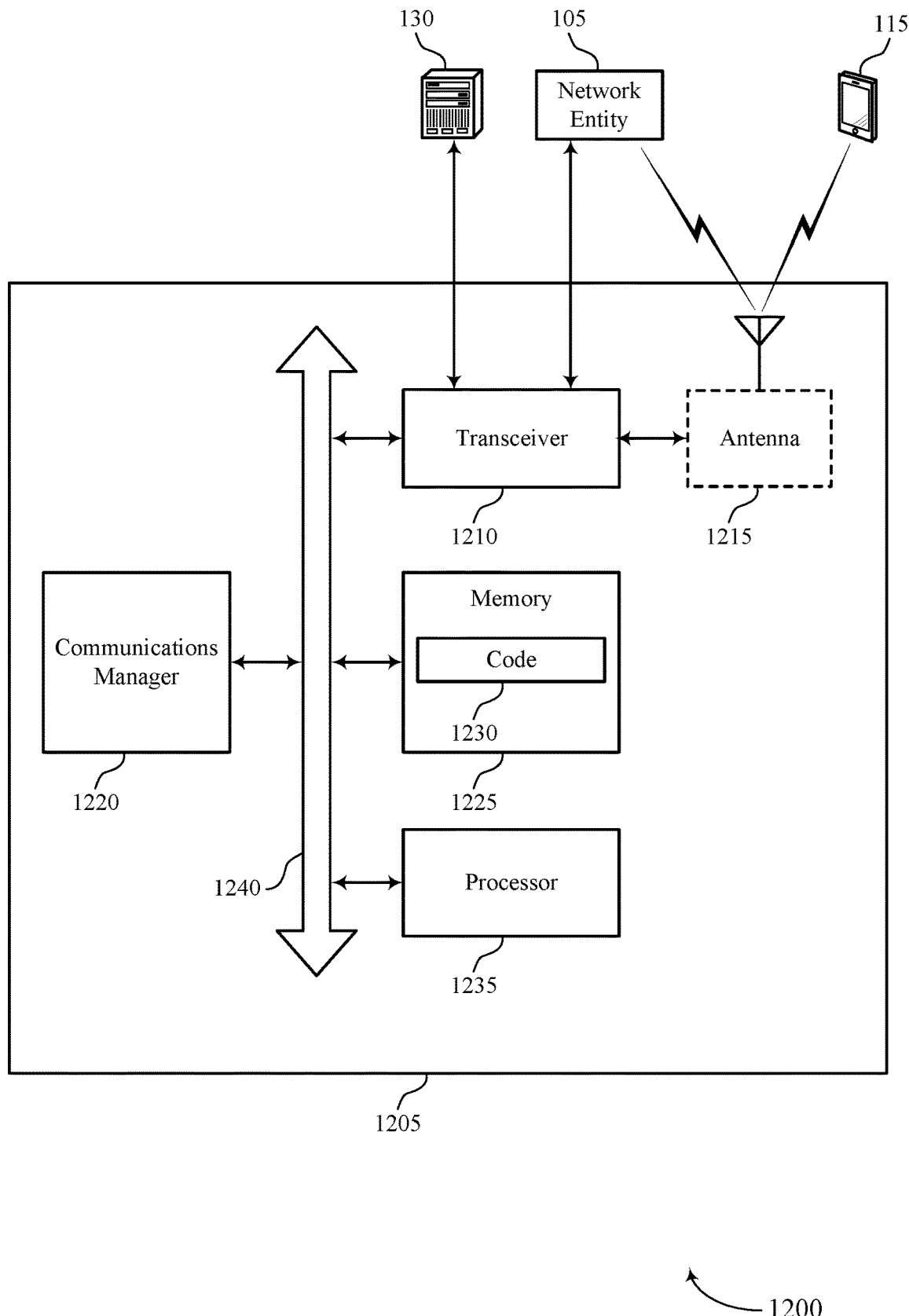
FIG. 12 illustrates a diagram of a system including a device that supports interference prediction with network configuration information in accordance with one or more aspects of the present disclosure.

FIG. 12 illustrates a diagram of a system 1200 including a device 1205 that supports interference prediction with network configuration information in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting interference prediction with network configuration information). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, an assistance information message including network configuration information corresponding to one or more inputs of an interference-prediction machine learning model at the UE, where the network configuration information includes a set of parameters associated with one or more neighboring cell configurations. The communications manager 1220 may be configured as or otherwise support a means for receiving, with a channel state information report, a channel interference prediction corresponding to one or more communication links at the UE based on the network configuration information included in the assistance information message. The communications manager 1220 may be configured as or otherwise support a means for communicating with the UE based on the channel interference prediction.

By including or configuring the communications manager 1220 in accordance with examples as described herein, the device 1205 may support techniques for improved communication reliability, reduced latency, improved user experience related to reduced interference latency, more efficient utilization of communication resources, improved coordination and integration between devices, reduced signaling overhead, increased efficiency and effectiveness for machine learning, and reduced communications interference.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of interference prediction with network configuration information as described herein, or the processor 1235 and the memory 1225 may be otherwise configured to perform or support such operations.

Figure 13:
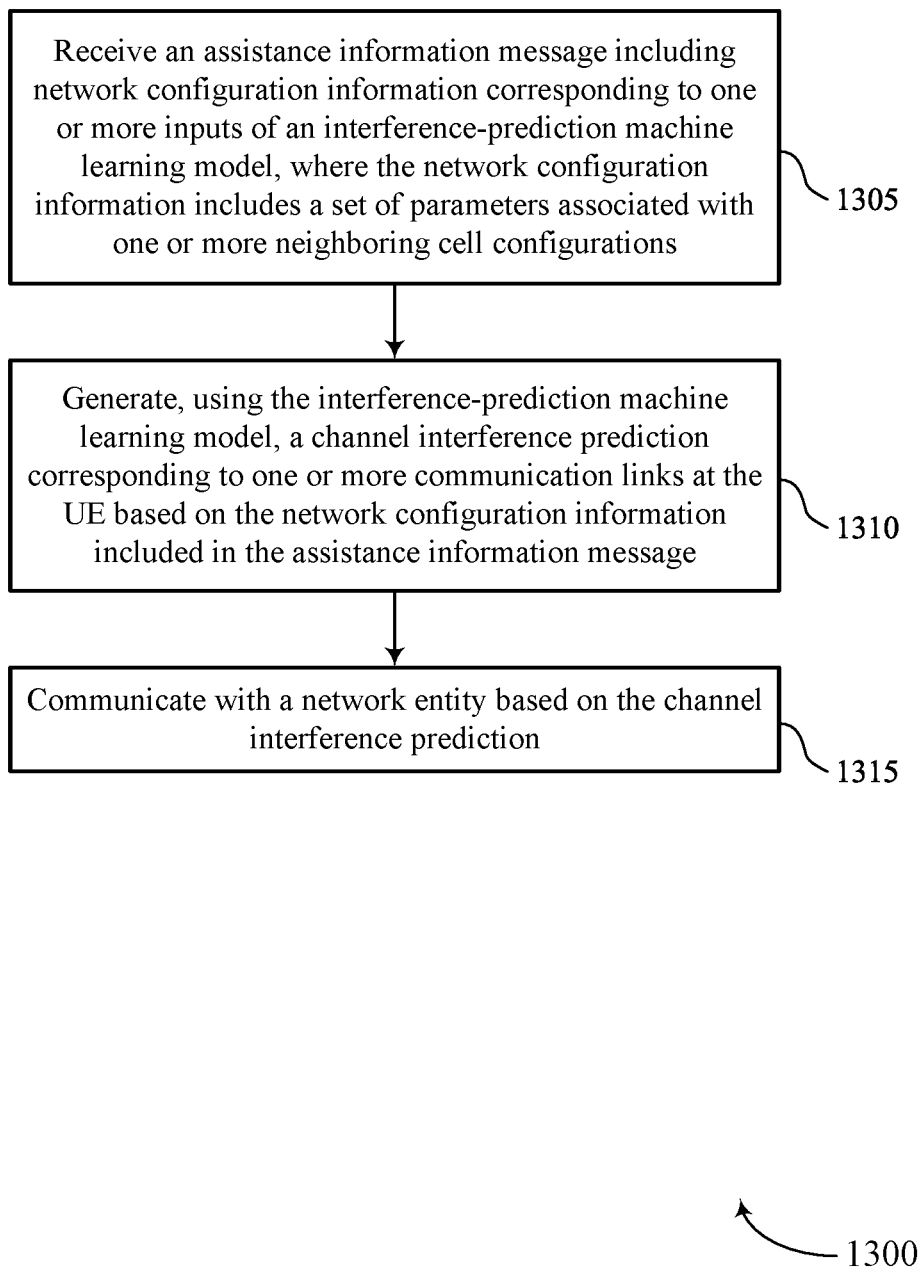
FIGS. 13 through 15 illustrate flowcharts showing methods that support interference prediction with network configuration information in accordance with one or more aspects of the present disclosure.

FIG. 13 illustrates a flowchart showing a method 1300 that supports interference prediction with network configuration information in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving an assistance information message including network configuration information corresponding to one or more inputs of an interference-prediction machine learning model, where the network configuration information includes a set of parameters associated with one or more neighboring cell configurations. The operations of 1305 may be performed in accordance with examples as disclosed herein. In some examples, aspects of the operations of 1305 may be performed by an assistance information manager 725 as described with reference to FIG. 7.

At 1310, the method may include generating, using the interference-prediction machine learning model, a channel interference prediction corresponding to one or more communication links at the UE based on the network configuration information included in the assistance information message. The operations of 1310 may be performed in accordance with examples as disclosed herein. In some examples, aspects of the operations of 1310 may be performed by an interference prediction component 730 as described with reference to FIG. 7.

At 1315, the method may include communicating with a network entity based on the channel interference prediction. The operations of 1315 may be performed in accordance with examples as disclosed herein. In some examples, aspects of the operations of 1315 may be performed by a channel interference management component 735 as described with reference to FIG. 7.

Figure 14:
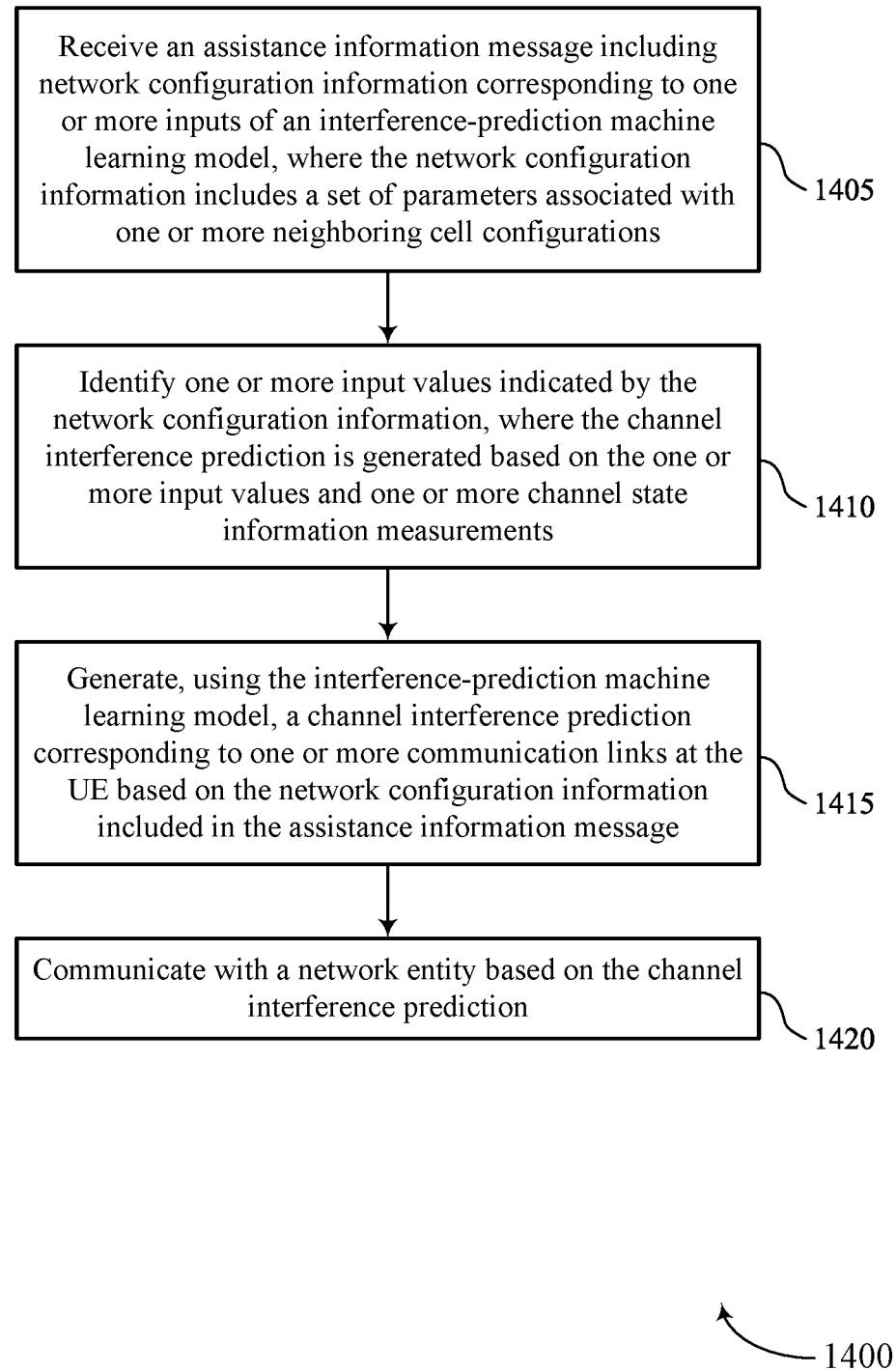

FIG. 14 illustrates a flowchart showing a method 1400 that supports interference prediction with network configuration information in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving an assistance information message including network configuration information corresponding to one or more inputs of an interference-prediction machine learning model, where the network configuration information includes a set of parameters associated with one or more neighboring cell configurations. The operations of 1405 may be performed in accordance with examples as disclosed herein. In some examples, aspects of the operations of 1405 may be performed by an assistance information manager 725 as described with reference to FIG. 7.

At 1410, the method may include identifying one or more input values indicated by the network configuration information, where the channel interference prediction is generated based on the one or more input values and one or more channel state information measurements. The operations of 1410 may be performed in accordance with examples as disclosed herein. In some examples, aspects of the operations of 1410 may be performed by an interference prediction component 730 as described with reference to FIG. 7.

At 1415, the method may include generating, using the interference-prediction machine learning model, a channel interference prediction corresponding to one or more communication links at the UE based on the network configuration information included in the assistance information message. The operations of 1415 may be performed in accordance with examples as disclosed herein. In some examples, aspects of the operations of 1415 may be performed by an interference prediction component 730 as described with reference to FIG. 7.

At 1420, the method may include communicating with a network entity based on the channel interference prediction. The operations of 1420 may be performed in accordance with examples as disclosed herein. In some examples, aspects of the operations of 1420 may be performed by a channel interference management component 735 as described with reference to FIG. 7.

Figure 15:
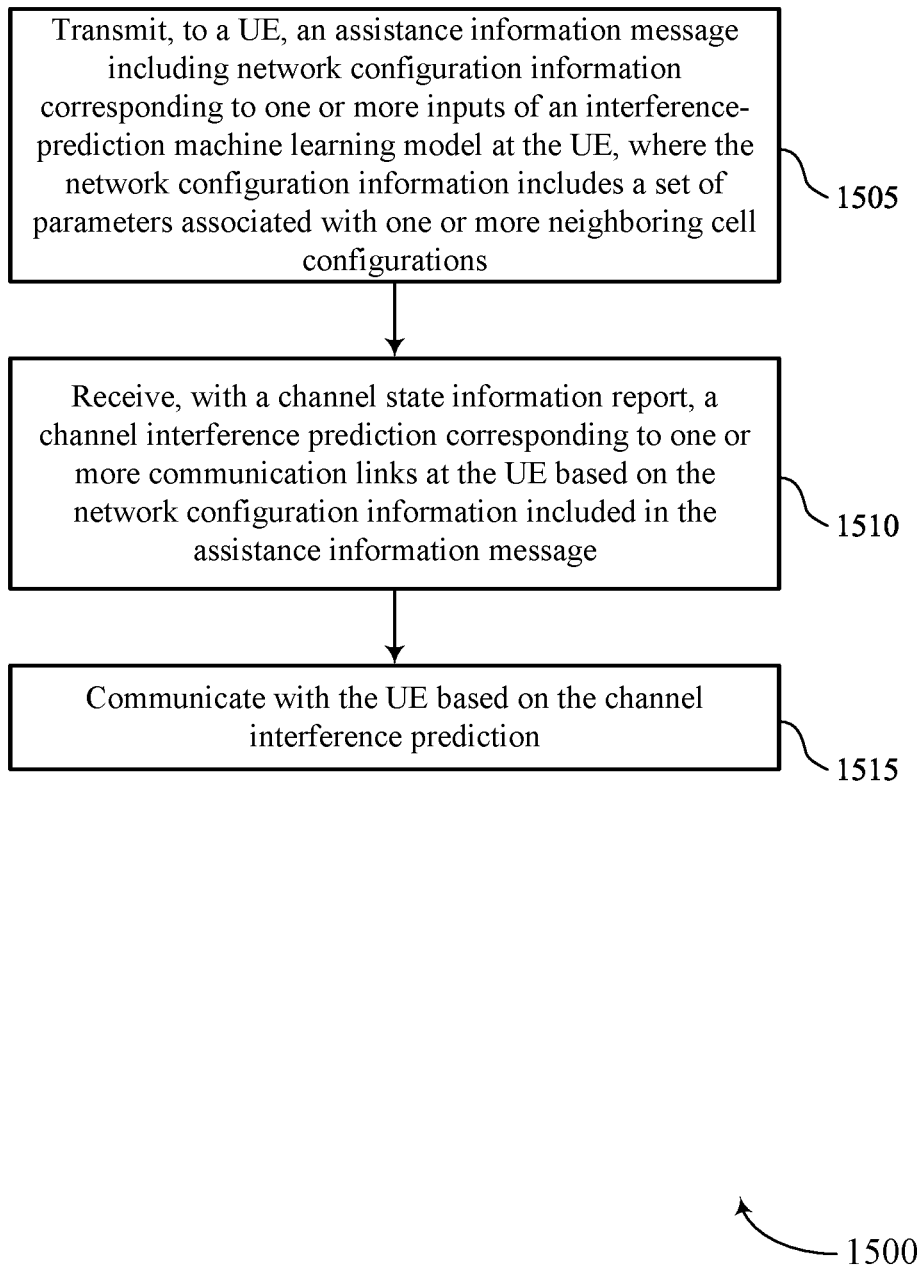

FIG. 15 illustrates a flowchart showing a method 1500 that supports interference prediction with network configuration information in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, an assistance information message including network configuration information corresponding to one or more inputs of an interference-prediction machine learning model at the UE, where the network configuration information includes a set of parameters associated with one or more neighboring cell configurations. The operations of 1505 may be performed in accordance with examples as disclosed herein. In some examples, aspects of the operations of 1505 may be performed by an assistance information manager 1125 as described with reference to FIG. 11.

At 1510, the method may include receiving, with a channel state information report, a channel interference prediction corresponding to one or more communication links at the UE based on the network configuration information included in the assistance information message. The operations of 1510 may be performed in accordance with examples as disclosed herein. In some examples, aspects of the operations of 1510 may be performed by an interference prediction component 1130 as described with reference to FIG. 11.

At 1515, the method may include communicating with the UE based on the channel interference prediction. The operations of 1515 may be performed in accordance with examples as disclosed herein. In some examples, aspects of the operations of 1515 may be performed by a channel interference management component 1135 as described with reference to FIG. 11.

The following provides an overview of aspects of the present disclosure:

Aspect 1: A method for wireless communication at a UE, comprising: receiving an assistance information message including network configuration information corresponding to one or more inputs of an interference-prediction machine learning model, wherein the network configuration information comprises a set of parameters associated with one or more neighboring cell configurations; generating, using the interference-prediction machine learning model, a channel interference prediction corresponding to one or more communication links at the UE based at least in part on the network configuration information included in the assistance information message; and communicating with a network entity based at least in part on the channel interference prediction.

Aspect 2: The method of aspect 1, further comprising: identifying one or more input values indicated by the network configuration information, wherein the channel interference prediction is generated based at least in part on the one or more input values and one or more CSI measurements.

Aspect 3: The method of any of aspects 1 through 2, further comprising: receiving, via the assistance information message, an indication of one or more modifications to the interference-prediction machine learning model based at least in part on the network configuration information, wherein the channel interference prediction is generated in accordance with the one or more modifications to the interference-prediction machine learning model.

Aspect 4: The method of aspect 3, wherein the one or more modifications to the interference-prediction machine learning model comprise one or more parameters associated with the interference-prediction machine learning model that have been modified, an algorithm configuration of the interference-prediction machine learning model that has been modified, or both.

Aspect 5: The method of any of aspects 1 through 4, wherein the interference-prediction machine learning model comprises a first interference-prediction machine learning model candidate of a plurality of interference-prediction machine learning model candidates, the method further comprising: receiving an indication of the plurality of interference-prediction machine learning model candidates including the first interference-prediction machine learning model candidate, each of the plurality of interference-prediction machine learning model candidates corresponding to a respective network configuration; and selecting the first interference-prediction machine learning model candidate based at least in part on the network configuration information.

Aspect 6: The method of aspect 5, further comprising: receiving an indication of one or more changes to the network configuration information; and selecting a second interference-prediction machine learning model candidate from the plurality of interference-prediction machine learning model candidates based at least in part on the one or more changes to the network configuration information.

Aspect 7: The method of any of aspects 1 through 6, further comprising: receiving an indication of one or more changes to the network configuration information; and transmitting a message that requests an updated interference-prediction machine learning model based at least in part on the one or more changes to the network configuration information.

Aspect 8: The method of any of aspects 1 through 7, further comprising: receiving, via the assistance information message, an indication of a transmission timing pattern associated with active and inactive states of one or more devices of neighboring cells; and applying the transmission timing pattern to the one or more inputs of the interference-prediction machine learning model to generate the channel interference prediction.

Aspect 9: The method of any of aspects 1 through 8, wherein the interference-prediction machine learning model comprises a first interference-prediction machine learning model, the method further comprising: receiving, via the assistance information message, a transmission timing pattern associated with active and inactive states of one or more interfering devices; and switching between the first interference-prediction machine learning model and a second interference-prediction machine learning model in accordance with the transmission timing pattern, wherein the channel interference prediction is generated based at least in part on the active and inactive states of the one or more interfering devices.

Aspect 10: The method of any of aspects 1 through 9, wherein receiving the assistance information message further comprises: receiving the assistance information message via a MAC-CE, an RRC message, a DCI message, or any combination thereof, wherein the assistance information message indicates values of the one or more inputs of the interference-prediction machine learning model.

Aspect 11: The method of any of aspects 1 through 10, wherein the network configuration information comprises a load level associated with one or more neighboring cells, a load distribution associated with the one or more neighboring cells, an active status or inactive status of the one or more neighboring cells, duty cycle information, scheduling behavior information, or any combination thereof.

Aspect 12: The method of any of aspects 1 through 11, wherein generating the channel interference prediction further comprises: generating a prediction of future channel interference associated with one or more beams, one or more beam groups, one or more transmission-reception points, or a combination thereof.

Aspect 13: The method of any of aspects 1 through 12, wherein generating the channel interference prediction further comprises: performing one or more CSI measurements associated with the one or more communication links at the UE; and generating the channel interference prediction based at least in part on the network configuration information and the one or more CSI measurements.

Aspect 14: A method for wireless communication at a network entity, comprising: transmitting, to a UE, an assistance information message including network configuration information corresponding to one or more inputs of an interference-prediction machine learning model at the UE, wherein the network configuration information comprises a set of parameters associated with one or more neighboring cell configurations; receiving, with a CSI report, a channel interference prediction corresponding to one or more communication links at the UE based at least in part on the network configuration information included in the assistance information message; and communicating with the UE based at least in part on the channel interference prediction.

Aspect 15: The method of aspect 14, further comprising: transmitting, via the assistance information message, an indication of one or more modifications to the interference-prediction machine learning model based at least in part on the network configuration information; and receiving the channel interference prediction in accordance with the one or more modifications to the interference-prediction machine learning model.

Aspect 16: The method of aspect 15, wherein the one or more modifications to the interference-prediction machine learning model comprise one or more parameters associated with the interference-prediction machine learning model that have been modified, an algorithm configuration of the interference-prediction machine learning model that has been modified, or both.

Aspect 17: The method of any of aspects 14 through 16, wherein the interference-prediction machine learning model comprises a first interference-prediction machine learning model candidate of a plurality of interference-prediction machine learning model candidates, the method further comprising: transmitting an indication of the plurality of interference-prediction machine learning model candidates including the first interference-prediction machine learning model candidate selected for the UE, each of the plurality of interference-prediction machine learning model candidates corresponding to a respective network configuration.

Aspect 18: The method of any of aspects 14 through 17, wherein transmitting the assistance information message further comprises: transmitting an indication of one or more changes to the network configuration information; and receiving a message that requests an updated interference-prediction machine learning model based at least in part on the one or more changes to the network configuration information.

Aspect 19: The method of any of aspects 14 through 18, further comprising: transmitting, via the assistance information message, an indication of a transmission timing pattern associated with active and inactive states of one or more devices of neighboring cells to be applied to the one or more inputs of the interference-prediction machine learning model.

Aspect 20: An apparatus for wireless communication at a UE, comprising a processor; memory coupled with the processor; and instructions stored in the memory and executable by the processor to cause the apparatus to perform a method of any of aspects 1 through 13.

Aspect 21: An apparatus for wireless communication at a UE, comprising at least one means for performing a method of any of aspects 1 through 13.

Aspect 22: A non-transitory computer-readable medium storing code for wireless communication at a UE, the code comprising instructions executable by a processor to perform a method of any of aspects 1 through 13.

Aspect 23: An apparatus for wireless communication at a network entity, comprising a processor; memory coupled with the processor; and instructions stored in the memory and executable by the processor to cause the apparatus to perform a method of any of aspects 14 through 19.

Aspect 24: An apparatus for wireless communication at a network entity, comprising at least one means for performing a method of any of aspects 14 through 19.

Aspect 25: A non-transitory computer-readable medium storing code for wireless communication at a network entity, the code comprising instructions executable by a processor to perform a method of any of aspects 14 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
a processor;
memory coupled with the processor; and
instructions stored in the memory and executable by the processor to cause the apparatus to:
receive an assistance information message including network configuration information corresponding to one or more inputs of an interference-prediction machine learning model, wherein the network configuration information comprises a set of parameters associated with one or more neighboring cell configurations;
generate, using the interference-prediction machine learning model, a channel interference prediction corresponding to one or more communication links at the UE based at least in part on the network configuration information included in the assistance information message; and
communicate with a network entity based at least in part on the channel interference prediction.

2. The apparatus of claim 1, wherein the instructions are further executable by the processor to cause the apparatus to:
identify one or more input values indicated by the network configuration information, wherein the channel interference prediction is generated based at least in part on the one or more input values and one or more channel state information measurements.

3. The apparatus of claim 1, wherein the instructions are further executable by the processor to cause the apparatus to:
receive, via the assistance information message, an indication of one or more modifications to the interference-prediction machine learning model based at least in part on the network configuration information, wherein the channel interference prediction is generated in accordance with the one or more modifications to the interference-prediction machine learning model.

4. The apparatus of claim 3, wherein the one or more modifications to the interference-prediction machine learning model comprise one or more parameters associated with the interference-prediction machine learning model that have been modified, an algorithm configuration of the interference-prediction machine learning model that has been modified, or both.

5. The apparatus of claim 1, wherein the interference-prediction machine learning model comprises a first interference-prediction machine learning model candidate of a plurality of interference-prediction machine learning model candidates, and the instructions are further executable by the processor to cause the apparatus to:
receive an indication of the plurality of interference-prediction machine learning model candidates including the first interference-prediction machine learning model candidate, each of the plurality of interference-prediction machine learning model candidates corresponding to a respective network configuration; and
select the first interference-prediction machine learning model candidate based at least in part on the network configuration information.

6. The apparatus of claim 5, wherein the instructions are further executable by the processor to cause the apparatus to:
receive an indication of one or more changes to the network configuration information; and
select a second interference-prediction machine learning model candidate from the plurality of interference-prediction machine learning model candidates based at least in part on the one or more changes to the network configuration information.

7. The apparatus of claim 1, wherein the instructions are further executable by the processor to cause the apparatus to:
receive an indication of one or more changes to the network configuration information; and
transmit a message that requests an updated interference-prediction machine learning model based at least in part on the one or more changes to the network configuration information.

8. The apparatus of claim 1, wherein the instructions are further executable by the processor to cause the apparatus to:
receive, via the assistance information message, an indication of a transmission timing pattern associated with active and inactive states of one or more devices of neighboring cells; and
apply the transmission timing pattern to the one or more inputs of the interference-prediction machine learning model to generate the channel interference prediction.

9. The apparatus of claim 1, wherein the interference-prediction machine learning model comprises a first interference-prediction machine learning model, and the instructions are further executable by the processor to cause the apparatus to:
receive, via the assistance information message, a transmission timing pattern associated with active and inactive states of one or more interfering devices; and
switch between the first interference-prediction machine learning model and a second interference-prediction machine learning model in accordance with the transmission timing pattern, wherein the channel interference prediction is generated based at least in part on the active and inactive states of the one or more interfering devices.

10. The apparatus of claim 1, wherein the instructions to receive the assistance information message are further executable by the processor to cause the apparatus to:
receive the assistance information message via a medium access control-control element, a radio resource control message, a downlink control information message, or any combination thereof, wherein the assistance information message indicates values of the one or more inputs of the interference-prediction machine learning model.

11. The apparatus of claim 1, wherein the network configuration information comprises a load level associated with one or more neighboring cells, a load distribution associated with the one or more neighboring cells, an active status or inactive status of the one or more neighboring cells, duty cycle information, scheduling behavior information, or any combination thereof.

12. The apparatus of claim 1, wherein the instructions to generate the channel interference prediction are further executable by the processor to cause the apparatus to:
generate a prediction of future channel interference associated with one or more beams, one or more beam groups, one or more transmission-reception points, or a combination thereof.

13. The apparatus of claim 1, wherein the instructions to generate the channel interference prediction are further executable by the processor to cause the apparatus to:

perform one or more channel state information measurements associated with the one or more communication links at the UE; and generate the channel interference prediction based at least in part on the network configuration information and the one or more channel state information measurements.

14. An apparatus for wireless communication at a network entity, comprising:

a processor;

memory coupled with the processor; and instructions stored in the memory and executable by the processor to cause the apparatus to:

transmit, to a user equipment (UE), an assistance information message including network configuration information corresponding to one or more inputs of an interference-prediction machine learning model at the UE, wherein the network configuration information comprises a set of parameters associated with one or more neighboring cell configurations;

receive, with a channel state information report, a channel interference prediction corresponding to one or more communication links at the UE based at least in part on the network configuration information included in the assistance information message; and communicate with the UE based at least in part on the channel interference prediction.

15. The apparatus of claim 14, wherein the instructions are further executable by the processor to cause the apparatus to:

transmit, via the assistance information message, an indication of one or more modifications to the interference-prediction machine learning model based at least in part on the network configuration information; and receive the channel interference prediction in accordance with the one or more modifications to the interference-prediction machine learning model.

16. The apparatus of claim 15, wherein the one or more modifications to the interference-prediction machine learning model comprise one or more parameters associated with the interference-prediction machine learning model that have been modified, an algorithm configuration of the interference-prediction machine learning model that has been modified, or both.

17. The apparatus of claim 14, wherein the interference-prediction machine learning model comprises a first interference-prediction machine learning model candidate of a plurality of interference-prediction machine learning model candidates, and the instructions are further executable by the processor to cause the apparatus to:

transmit an indication of the plurality of interference-prediction machine learning model candidates including the first interference-prediction machine learning model candidate selected for the UE, each of the plurality of interference-prediction machine learning model candidates corresponding to a respective network configuration.

18. The apparatus of claim 14, wherein the instructions to transmit the assistance information message are further executable by the processor to cause the apparatus to:

transmit an indication of one or more changes to the network configuration information; and receive a message that requests an updated interference-prediction machine learning model based at least in part on the one or more changes to the network configuration information.

19. The apparatus of claim 14, wherein the instructions are further executable by the processor to cause the apparatus to:

transmit, via the assistance information message, an indication of a transmission timing pattern associated with active and inactive states of one or more devices of neighboring cells to be applied to the one or more inputs of the interference-prediction machine learning model.

20. A method for wireless communication at a user equipment (UE), comprising:

receiving an assistance information message including network configuration information corresponding to one or more inputs of an interference-prediction machine learning model, wherein the network configuration information comprises a set of parameters associated with one or more neighboring cell configurations;

generating, using the interference-prediction machine learning model, a channel interference prediction corresponding to one or more communication links at the UE based at least in part on the network configuration information included in the assistance information message; and communicating with a network entity based at least in part on the channel interference prediction.

* * * * *